(12) United States Patent
Yun et al.

(10) Patent No.: US 8,121,207 B2
(45) Date of Patent: Feb. 21, 2012

(54) METHOD FOR TRANSFORMING DATA, AND METHOD FOR TRANSMITTING AND RECEIVING DATA USING THE SAME

(75) Inventors: Young Woo Yun, Gyeonggi-do (KR); Hak Seong Kim, Seoul (KR); Bong Hoe Kim, Gyeonggi-do (KR); Joon Kui Ahn, Seoul (KR); Dong Youn Seo, Seoul (KR); Jung Hoon Lee, Seoul (KR); Ki Jun Kim, Seoul (KR); Suk Hyon Yoon, Seoul (KR); Eun Sun Kim, Seoul (KR); Dae Won Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/293,417

(22) PCT Filed: Mar. 19, 2007

(86) PCT No.: PCT/KR2007/001326
§ 371 (c)(1),
(2), (4) Date: Jul. 9, 2009

(87) PCT Pub. No.: WO2007/108624
PCT Pub. Date: Sep. 27, 2007

(65) Prior Publication Data
US 2009/0274220 A1 Nov. 5, 2009

Related U.S. Application Data

(60) Provisional application No. 60/783,739, filed on Mar. 17, 2006, provisional application No. 60/827,872, filed on Oct. 2, 2006.

(30) Foreign Application Priority Data

| | | |
|---|---|---|
| May 2, 2006 | (JP) | 10-2006-0039579 |
| Jun. 8, 2006 | (JP) | 10-2006-0051443 |
| Oct. 2, 2006 | (JP) | 10-2006-0097400 |
| Jan. 4, 2007 | (JP) | 10-2007-0001079 |

(51) Int. Cl.
*H04L 27/28* (2006.01)
*H04B 7/02* (2006.01)
(52) U.S. Cl. ..................... 375/260; 375/267
(58) Field of Classification Search ............... 375/260, 375/267
See application file for complete search history.

(56) References Cited

U.S. PATENT DOCUMENTS
6,075,554 A 6/2000 Andrews et al.
(Continued)

FOREIGN PATENT DOCUMENTS
CN 1688143 10/2005
(Continued)

*Primary Examiner* — Don N Vo
(74) *Attorney, Agent, or Firm* — Lee, Hong, Degerman, Kang & Waimey

(57) ABSTRACT

A method for transforming data to reduce an amount of data in a communication system equipped with several sub-carriers, and a data transmission method using the same are disclosed. The method for transmitting data using a Discrete Cosine Transform (DCT) in a communication system based on a plurality of sub-carriers includes: a) performing a Discrete Cosine Transform (DCT) on first data; b) selecting a predetermined number of data from among the DCT-processed first data, and performing data processing on the selected data; and c) transmitting the data-processed resultant data to a reception end. A method for reducing an amount of overhead of transmission data for use in the multi-antenna communication system is disclosed.

8 Claims, 43 Drawing Sheets

U.S. PATENT DOCUMENTS

| | | | |
|---|---|---|---|
| 6,724,842 B1* | 4/2004 | Hochwald et al. | 375/347 |
| 2003/0097354 A1 | 5/2003 | Finlay et al. | |
| 2004/0228271 A1* | 11/2004 | Marzetta | 370/210 |
| 2005/0135499 A1* | 6/2005 | Nam et al. | 375/267 |
| 2009/0220018 A1* | 9/2009 | Koga et al. | 375/260 |

FOREIGN PATENT DOCUMENTS

| | | |
|---|---|---|
| EP | 0524652 A2 | 1/1993 |
| JP | 07075092 | 3/1995 |
| JP | 07322243 | 12/1995 |
| JP | 10145772 | 5/1998 |
| JP | 11112482 | 4/1999 |
| JP | 11127082 | 5/1999 |
| JP | 2004524741 | 8/2004 |
| KR | 20050021687 | 3/2005 |
| WO | WO 03/019787 A2 | 3/2003 |
| WO | 2005/004426 | 1/2005 |

* cited by examiner

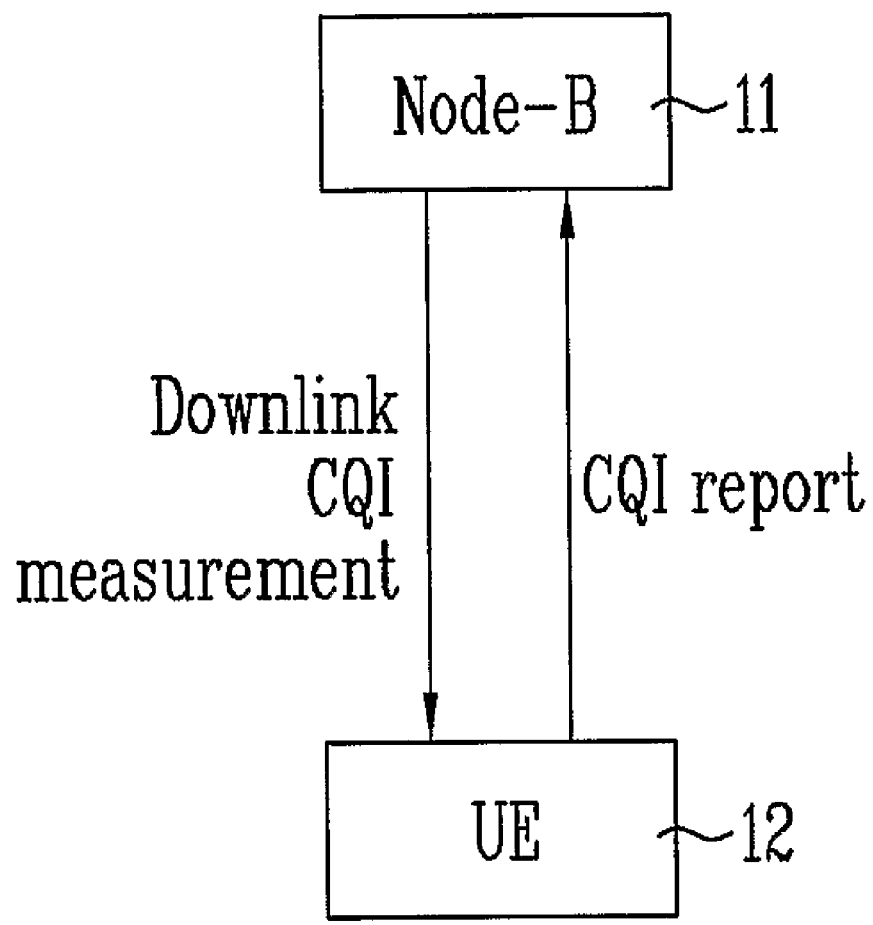
[Fig. 1]

[Fig. 2]
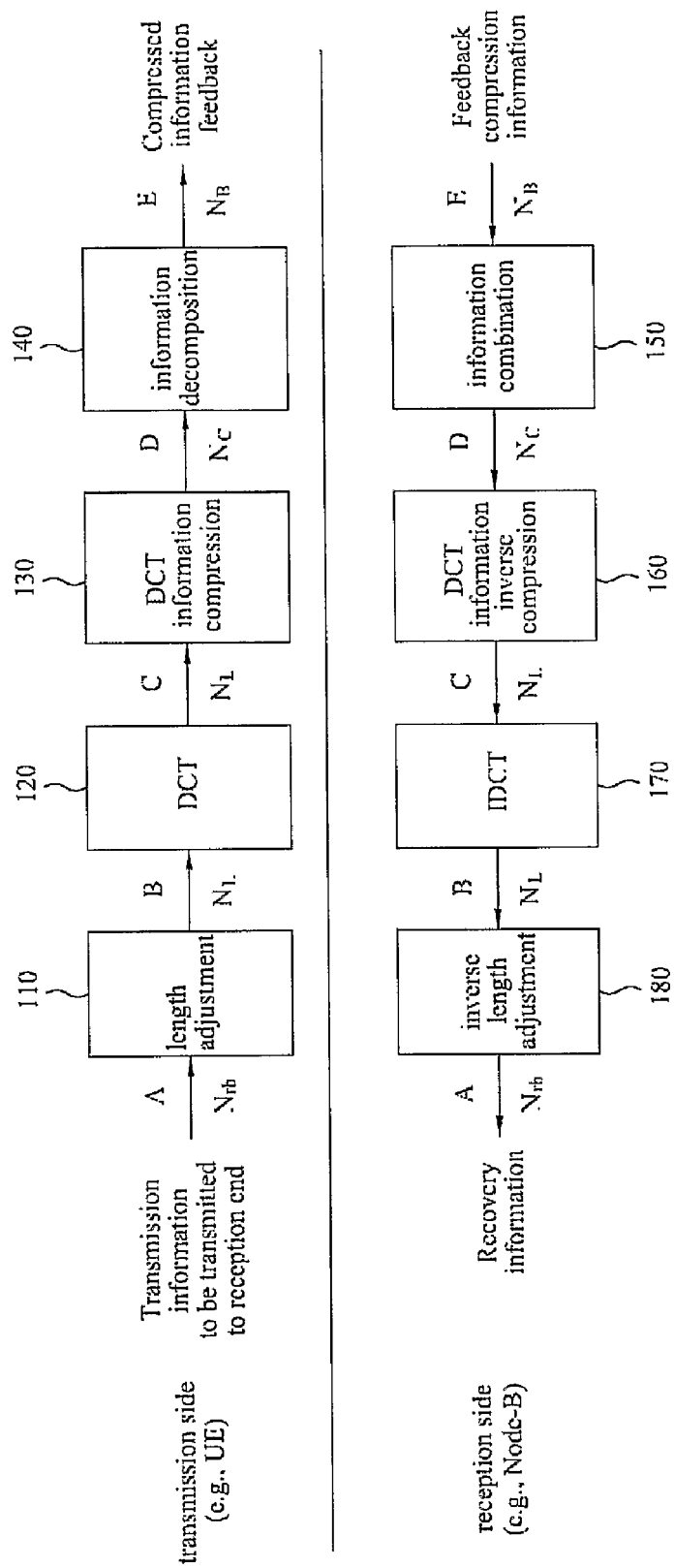

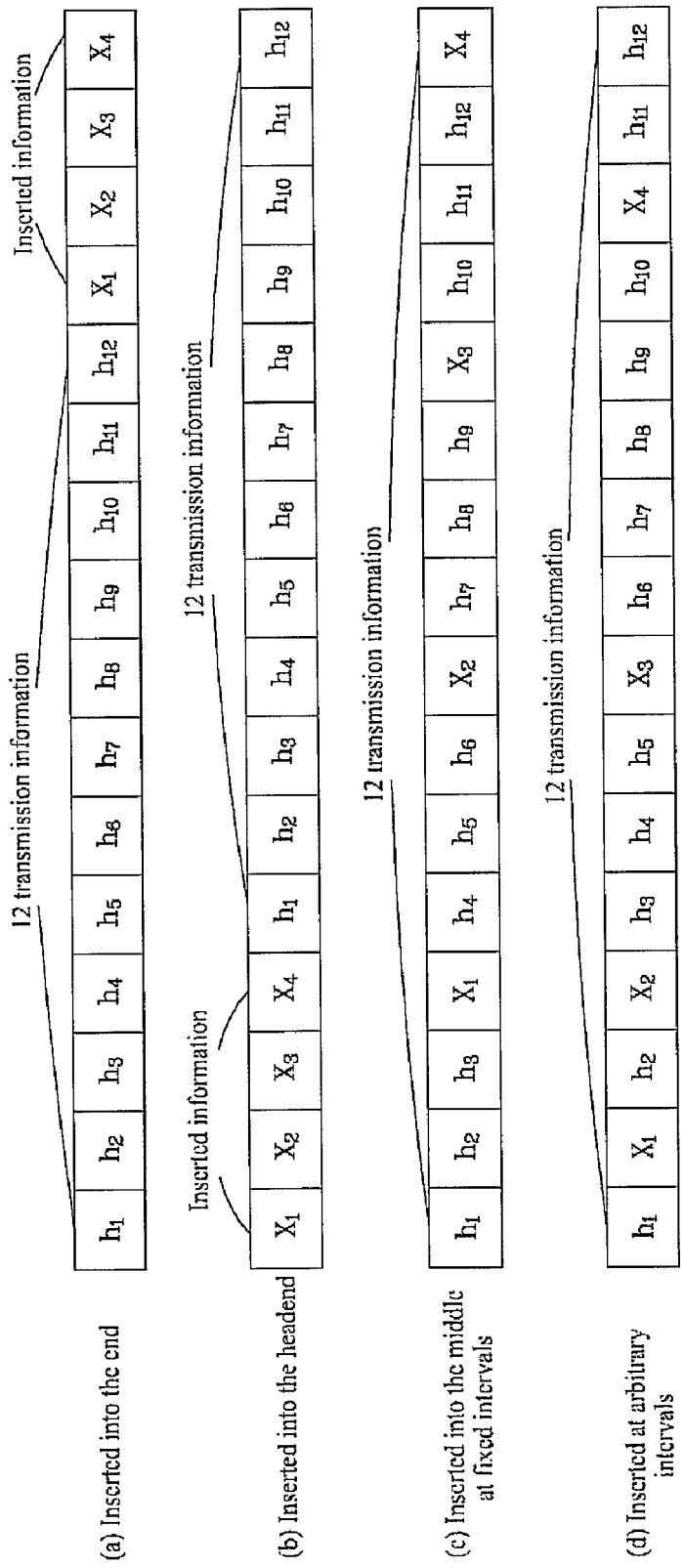
[Fig. 3]

[Fig. 4]
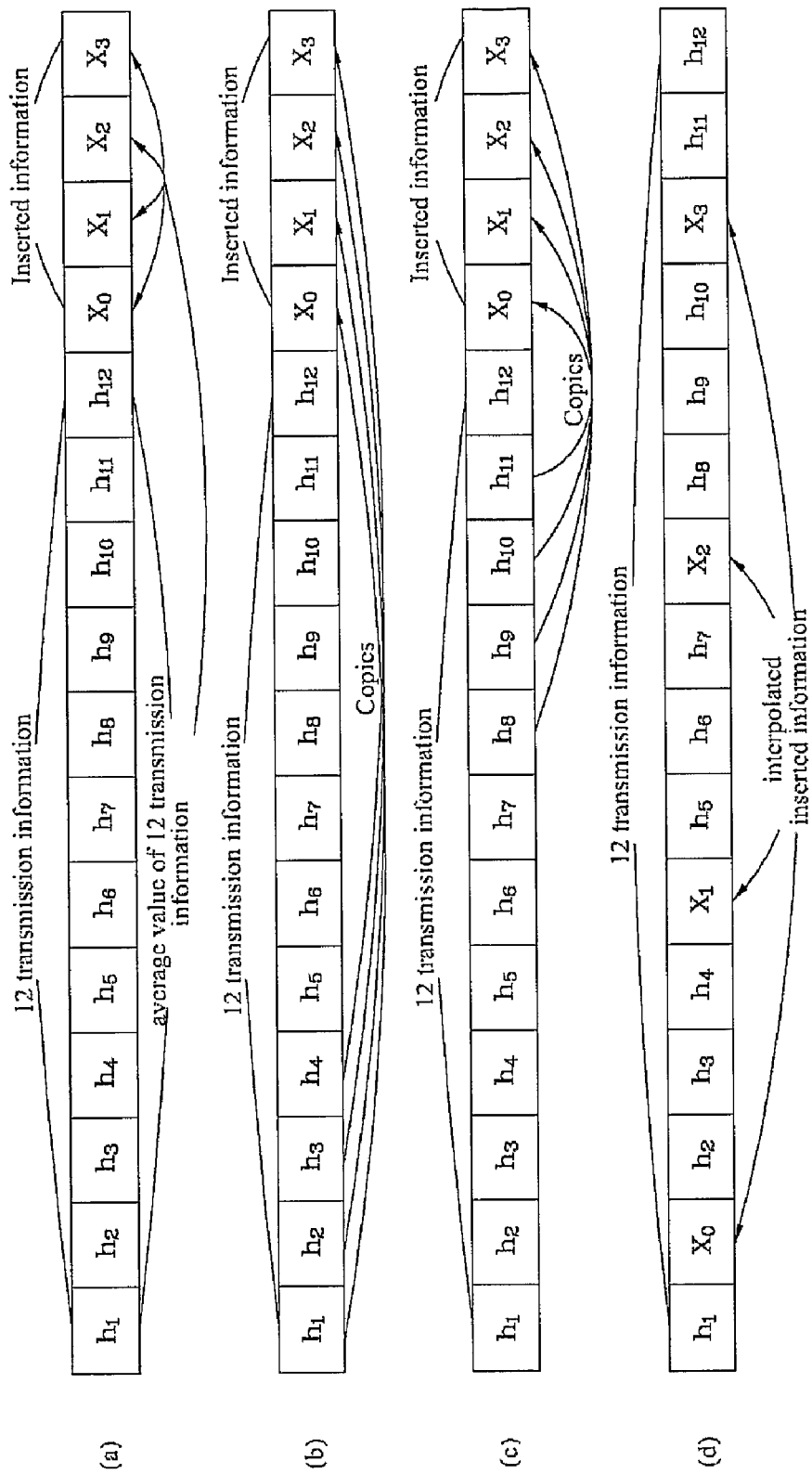

[Fig. 5]
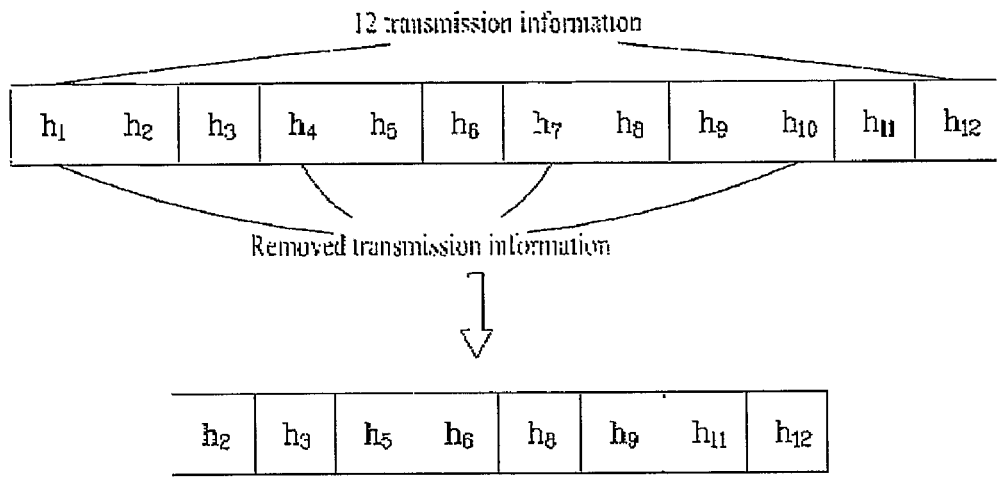
[Fig. 6]
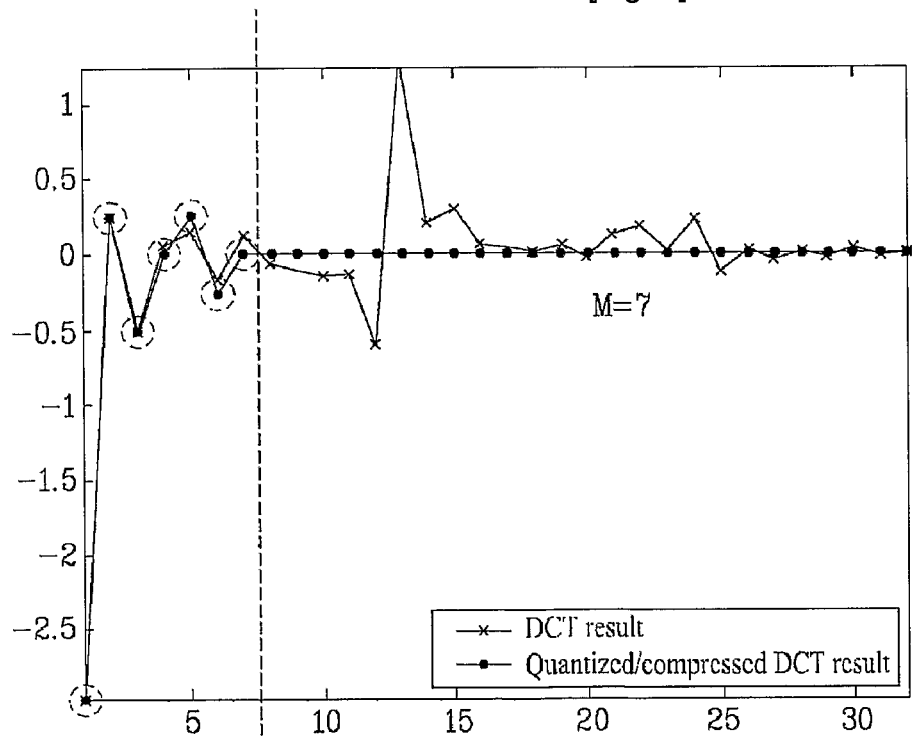

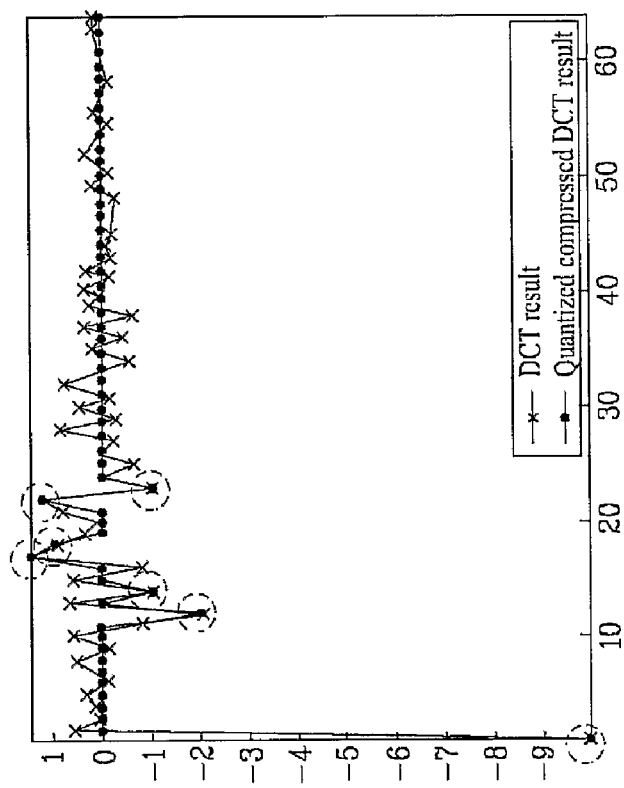
[Fig. 7]

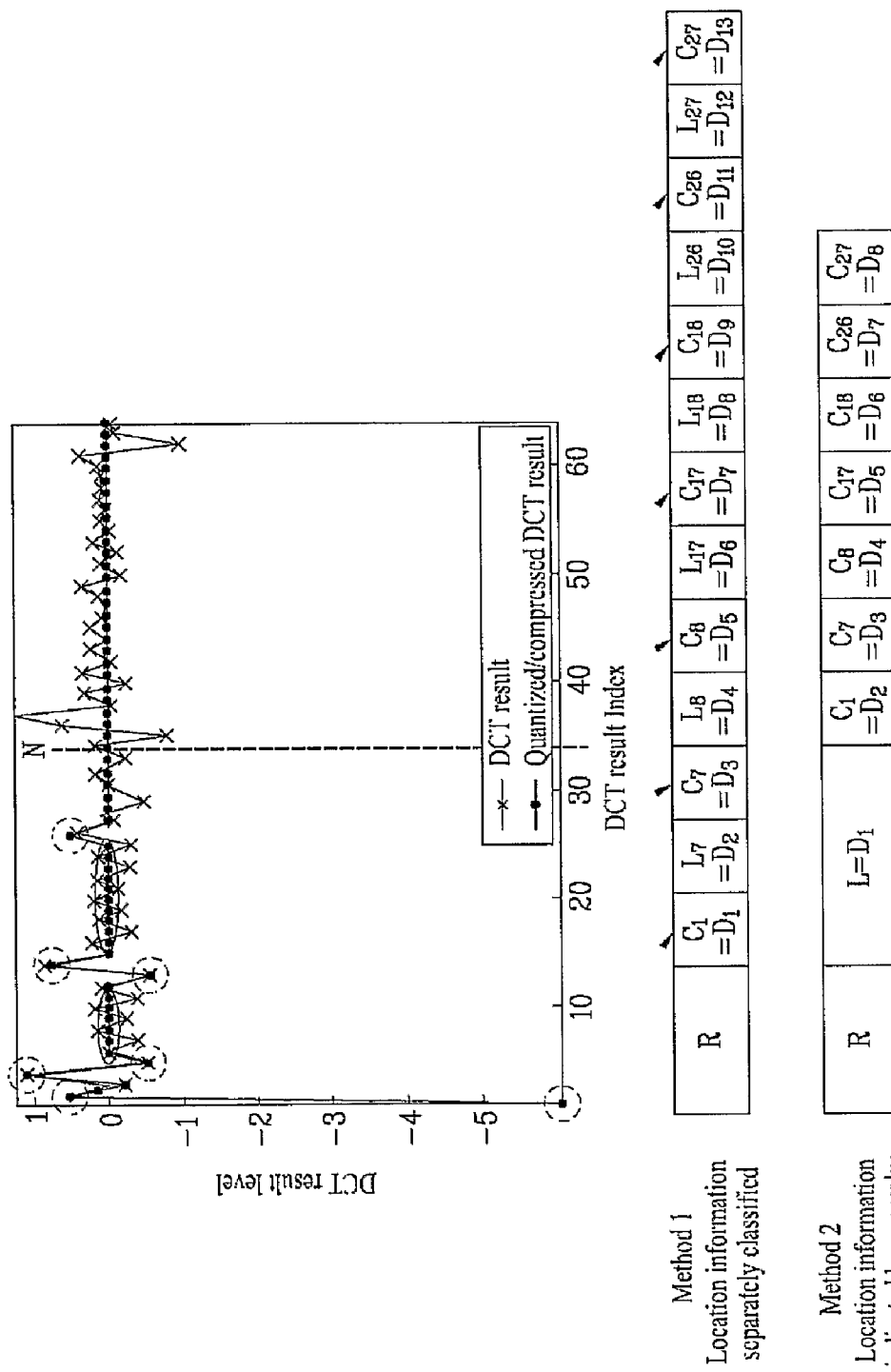

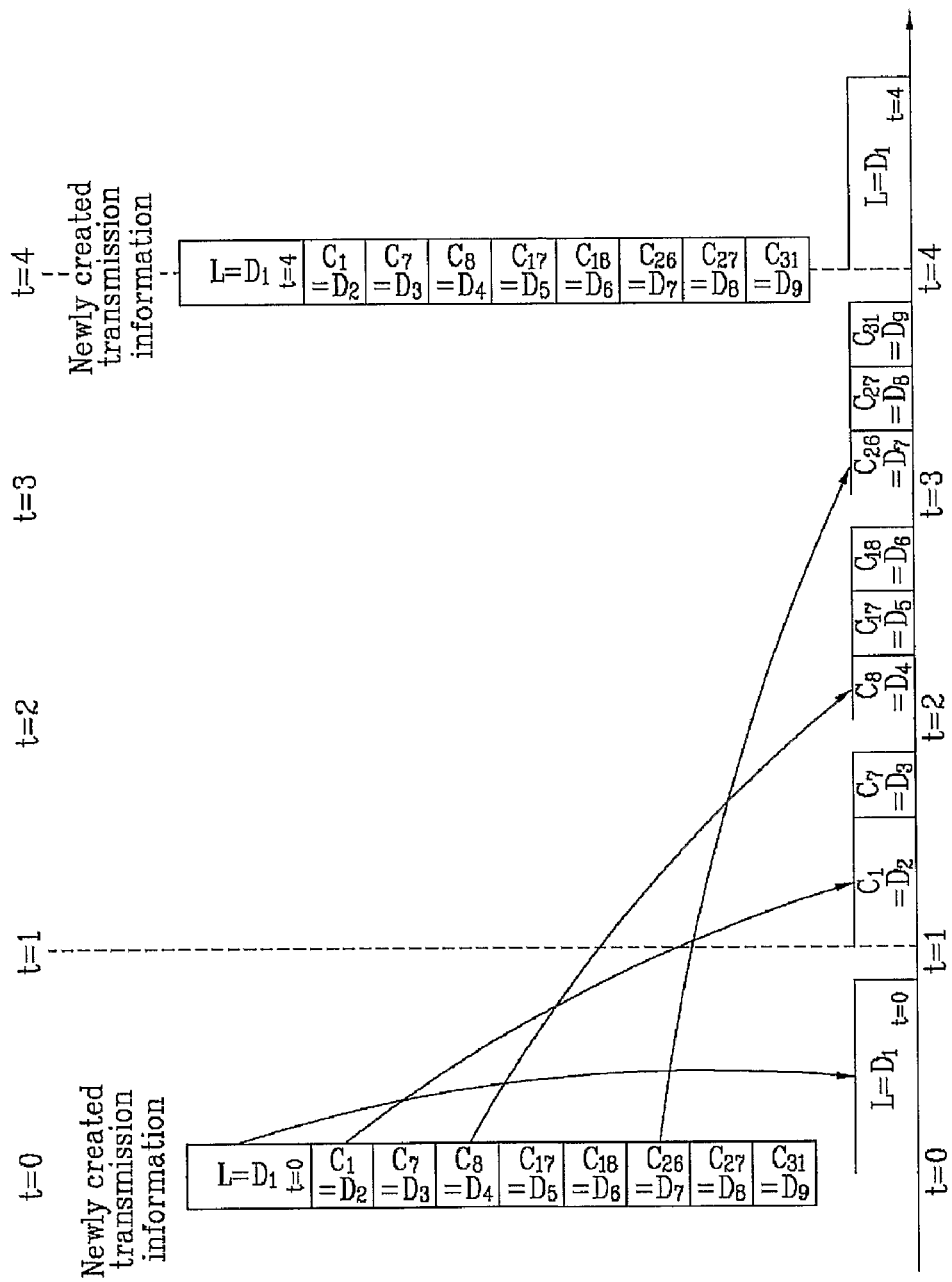
[Fig. 9]

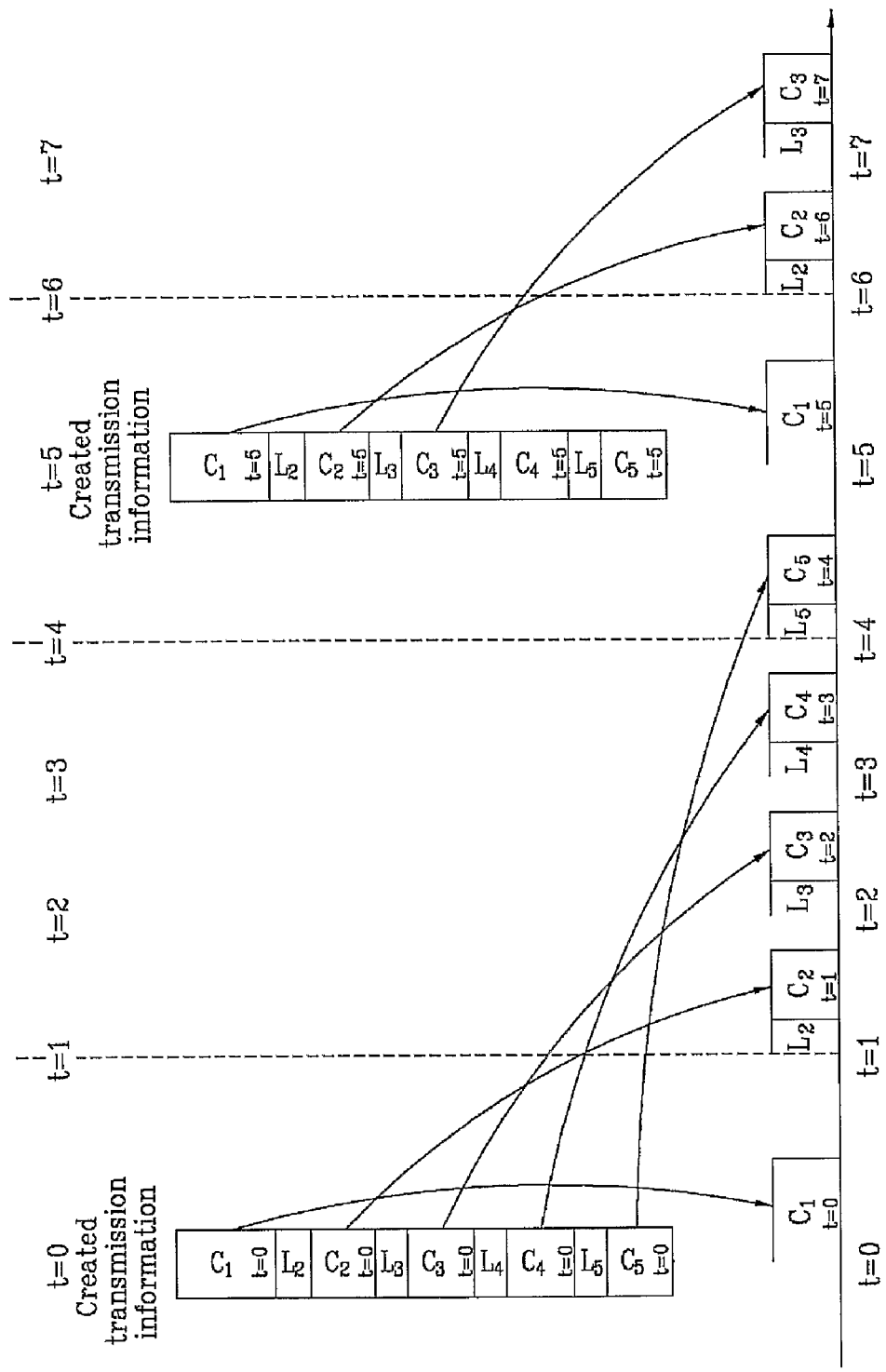
[Fig. 10]

[Fig. 11]
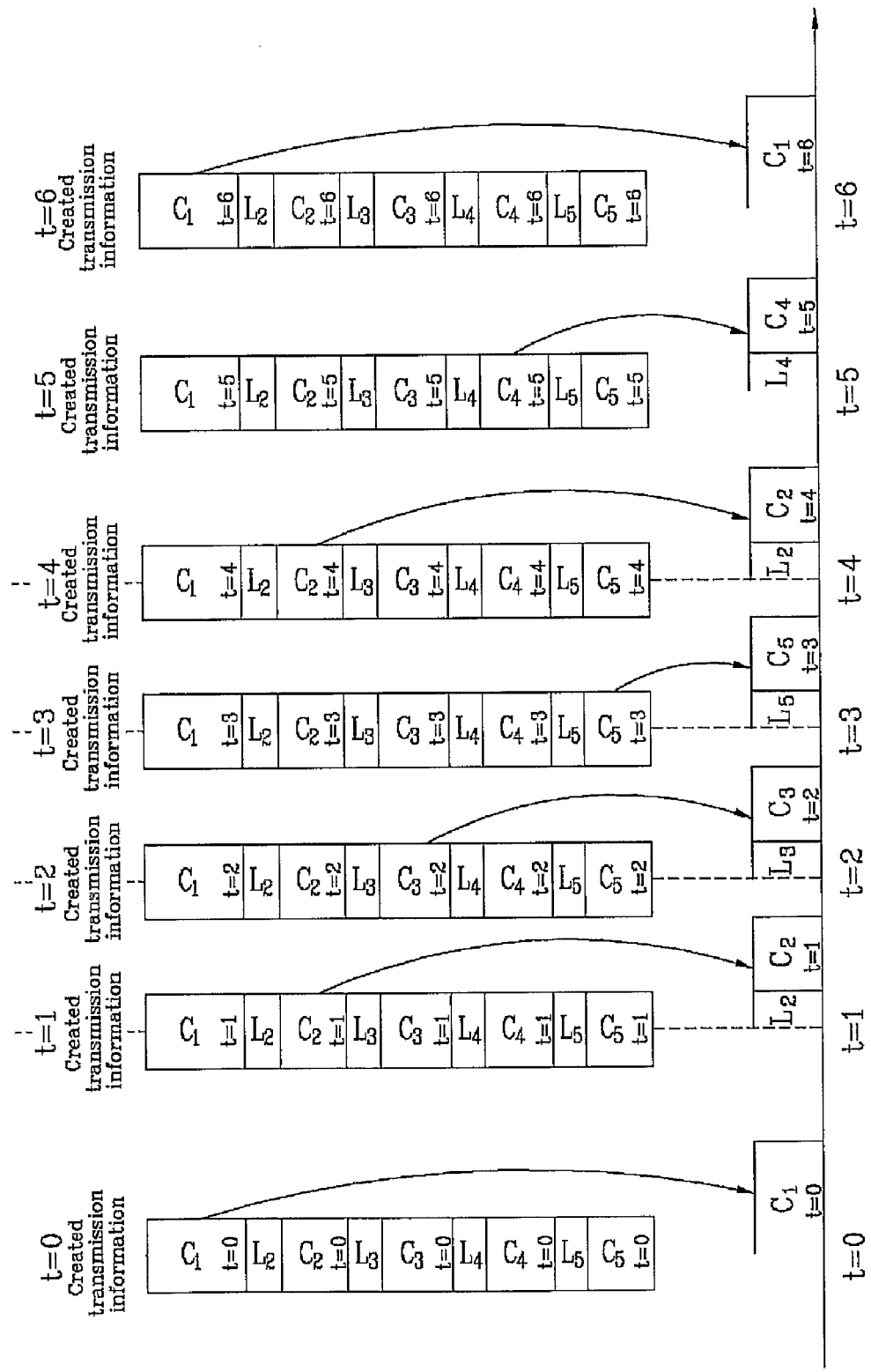

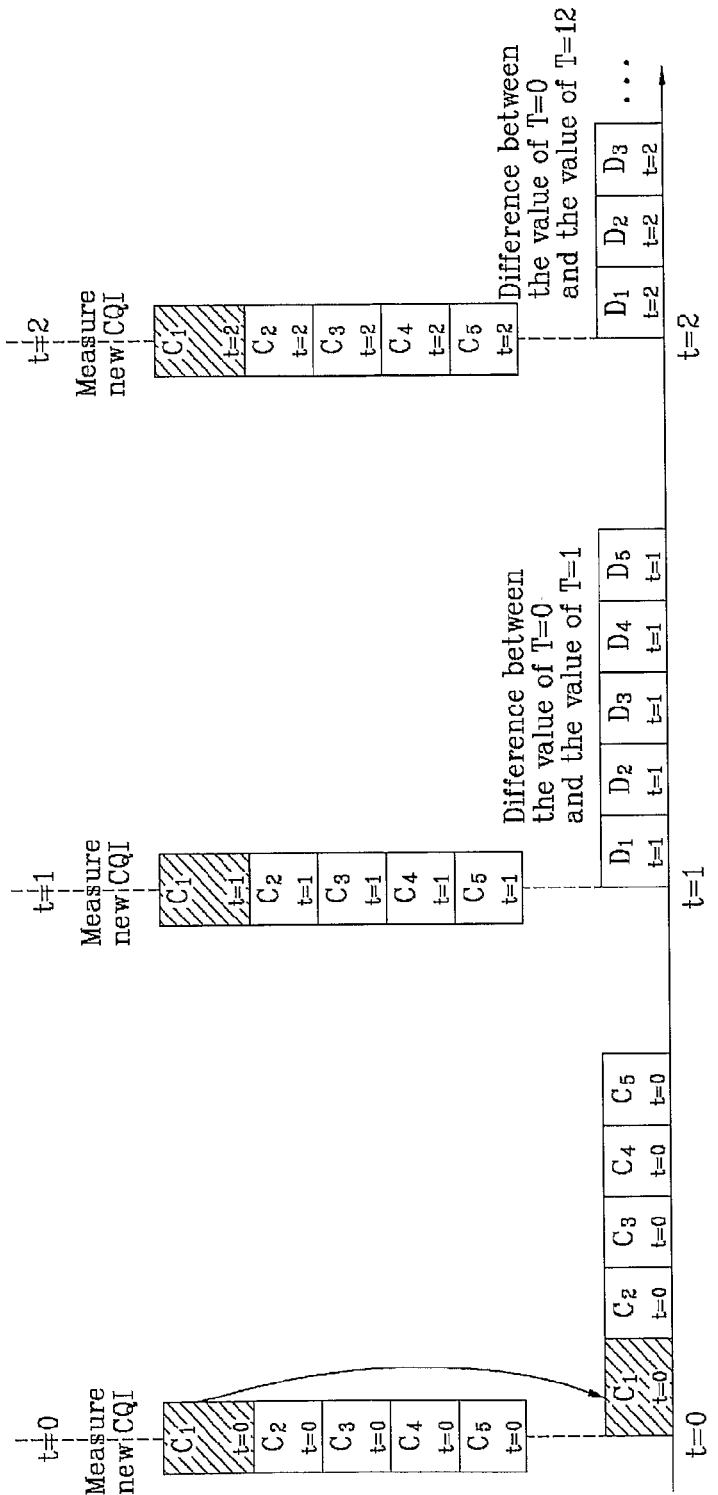
[Fig. 12]

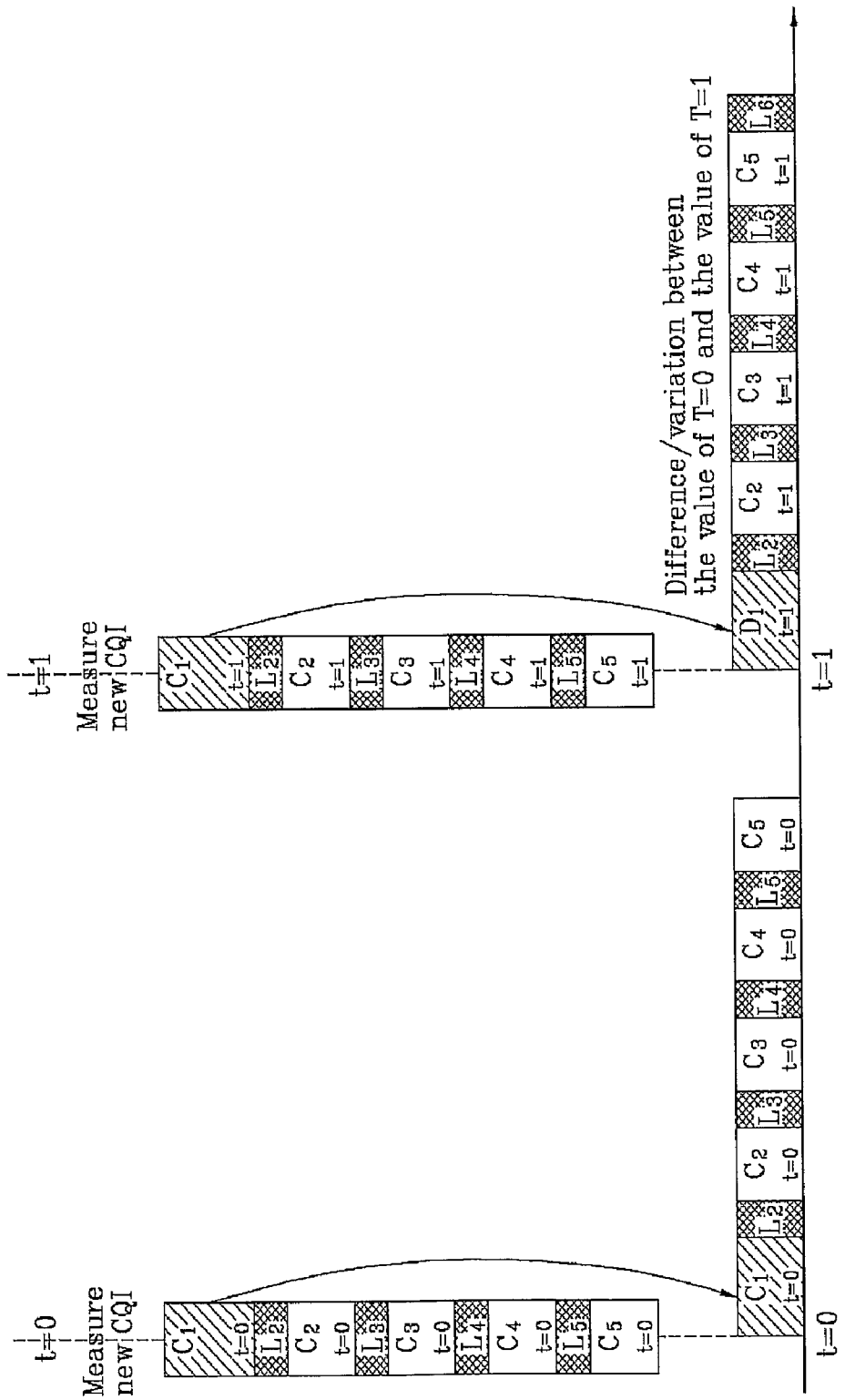
[Fig. 13]

[Fig. 14]
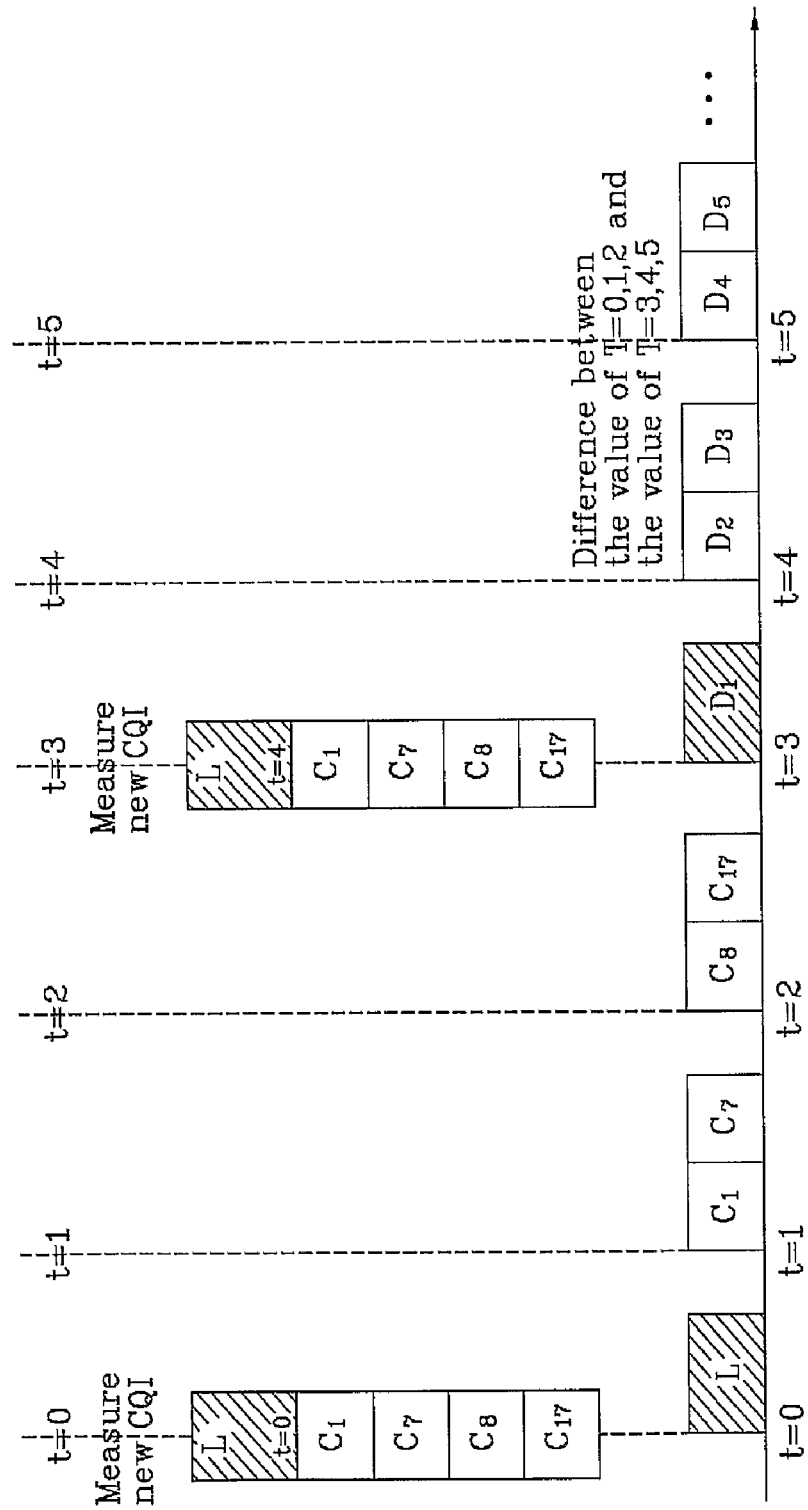

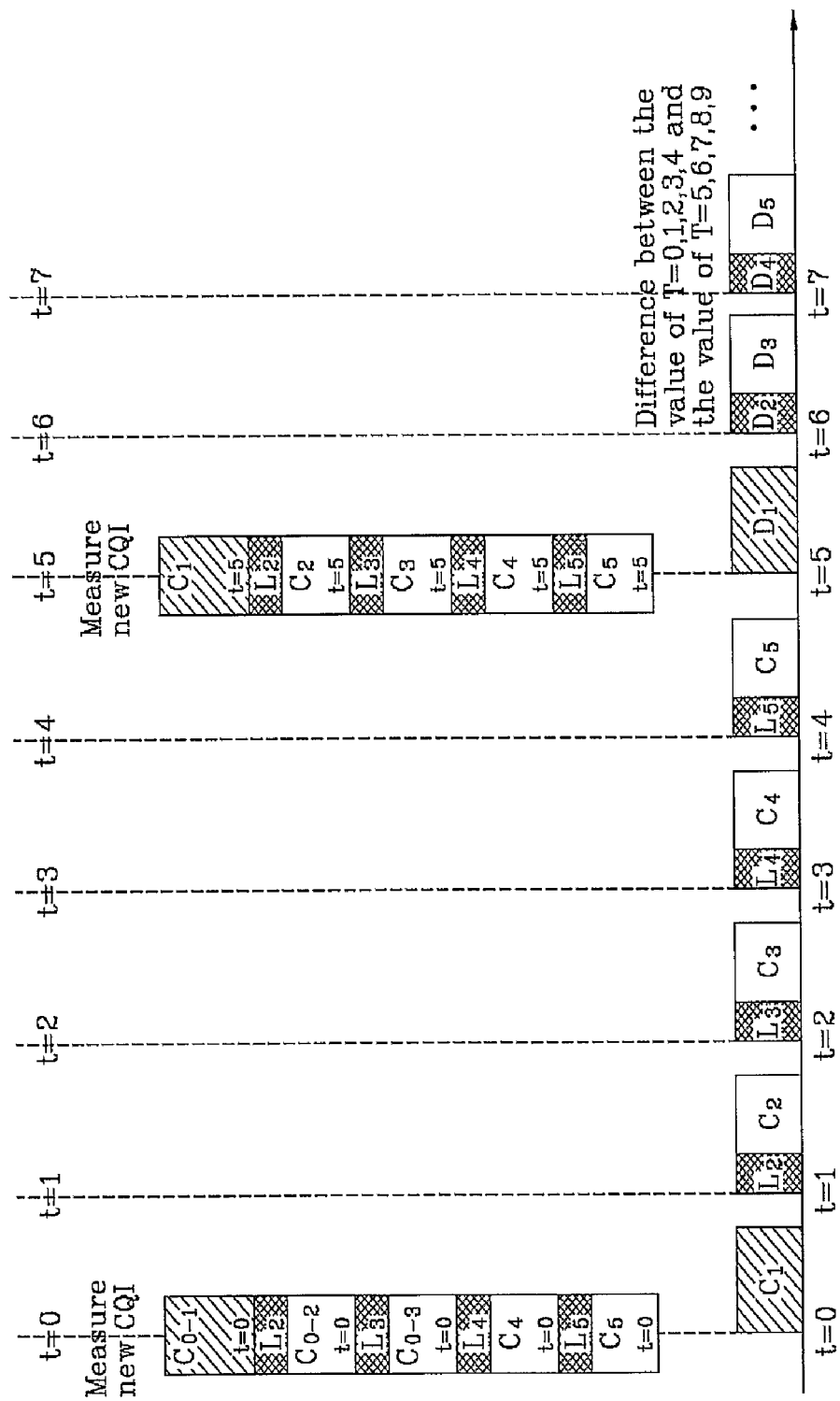
[Fig. 15]

[Fig. 16]

| Tx antenna \ CQI band | | 1 | 2 | 3 | 4 | 5 | 6 | 7 | 8 | 9 | 10 | 11 | 12 |
|---|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ — DCT |
|  | ant#2 | $\Delta^{(2)}_1$ | $\Delta^{(2)}_2$ | $\Delta^{(2)}_3$ | $\Delta^{(2)}_4$ | $\Delta^{(2)}_5$ | $\Delta^{(2)}_6$ | $\Delta^{(2)}_7$ | $\Delta^{(2)}_8$ | $\Delta^{(2)}_9$ | $\Delta^{(2)}_{10}$ | $\Delta^{(2)}_{11}$ | $\Delta^{(2)}_{12}$ — DM |
|  | ant#3 | $\Delta^{(3)}_1$ | $\Delta^{(3)}_2$ | $\Delta^{(3)}_3$ | $\Delta^{(3)}_4$ | $\Delta^{(3)}_5$ | $\Delta^{(3)}_6$ | $\Delta^{(3)}_7$ | $\Delta^{(3)}_8$ | $\Delta^{(3)}_9$ | $\Delta^{(3)}_{10}$ | $\Delta^{(3)}_{11}$ | $\Delta^{(3)}_{12}$ |
|  | ant#4 | $\Delta^{(4)}_1$ | $\Delta^{(4)}_2$ | $\Delta^{(4)}_3$ | $\Delta^{(4)}_4$ | $\Delta^{(4)}_5$ | $\Delta^{(4)}_6$ | $\Delta^{(4)}_7$ | $\Delta^{(4)}_8$ | $\Delta^{(4)}_9$ | $\Delta^{(4)}_{10}$ | $\Delta^{(4)}_{11}$ | $\Delta^{(4)}_{12}$ |
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ — DCT |
|  | ant#2 | $\Delta^{(2)}_1$ | $\Delta^{(2)}_2$ | $\Delta^{(2)}_3$ | $\Delta^{(2)}_4$ | $\Delta^{(2)}_5$ | $\Delta^{(2)}_6$ | $\Delta^{(2)}_7$ | $\Delta^{(2)}_8$ | $\Delta^{(2)}_9$ | $\Delta^{(2)}_{10}$ | $\Delta^{(2)}_{11}$ | $\Delta^{(2)}_{12}$ — DM |
|  | ant#3 | $\Delta^{(3)}_1$ | $\Delta^{(3)}_2$ | $\Delta^{(3)}_3$ | $\Delta^{(3)}_4$ | $\Delta^{(3)}_5$ | $\Delta^{(3)}_6$ | $\Delta^{(3)}_7$ | $\Delta^{(3)}_8$ | $\Delta^{(3)}_9$ | $\Delta^{(3)}_{10}$ | $\Delta^{(3)}_{11}$ | $\Delta^{(3)}_{12}$ |
|  | ant#4 | $\Delta^{(4)}_1$ | $\Delta^{(4)}_2$ | $\Delta^{(4)}_3$ | $\Delta^{(4)}_4$ | $\Delta^{(4)}_5$ | $\Delta^{(4)}_6$ | $\Delta^{(4)}_7$ | $\Delta^{(4)}_8$ | $\Delta^{(4)}_9$ | $\Delta^{(4)}_{10}$ | $\Delta^{(4)}_{11}$ | $\Delta^{(4)}_{12}$ |

Frequency area (e.g., 5MHz) CQI band

[Fig. 17]

| | 1 | 2 | 3 | 4 | 5 | 6 | 7 | 8 | 9 | 10 | 11 | 12 |
|---|---|---|---|---|---|---|---|---|---|---|---|---|
| $t_0$ ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| ant#2 | DM | DM | DM | DM | DM | DM | DM | DM | DM | DM | DM | DM |
| ant#3 | DM | DM | DM | DM | DM | DM | DM | DM | DM | DM | DM | DM |
| ant#4 | DM | DM | DM | DM | DM | DM | DM | DM | DM | DM | DM | DM |
| $t_1$ ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| ant#2 | DM | DM | DM | DM | DM | DM | DM | DM | DM | DM | DM | DM |
| ant#3 | DM | DM | DM | DM | DM | DM | DM | DM | DM | DM | DM | DM |
| ant#4 | DM | DM | DM | DM | DM | DM | DM | DM | DM | DM | DM | DM |

4x4 2D-DCT (applied to blocks 1–4, 5–8, 9–12)

[Fig. 18]

| | | 2D-DCT A1 | | | | 2D-DCT B1 | | | | 2D-DCT C1 | | |
|---|---|---|---|---|---|---|---|---|---|---|---|---|
| t$_1$ | ant#1 | SINR$^{(1)}_1$ | SINR$^{(1)}_2$ | SINR$^{(1)}_3$ | SINR$^{(1)}_4$ | SINR$^{(1)}_5$ | SINR$^{(1)}_6$ | SINR$^{(1)}_7$ | SINR$^{(1)}_8$ | SINR$^{(1)}_9$ | SINR$^{(1)}_{10}$ | SINR$^{(1)}_{11}$ | SINR$^{(1)}_{12}$ |
| | ant#2 | DM | DM | DM | DM | DM | DM | DM | DM | DM | DM | DM | DM |
| | ant#3 | DM | DM | DM | DM | DM | DM | DM | DM | DM | DM | DM | DM |
| | ant#4 | DM | DM | DM | DM | DM | DM | DM | DM | DM | DM | DM | DM |
| | | 2D-DCT A2 | | | | 2D-DCT B2 | | | | 2D-DCT C2 | | |
| t$_2$ | ant#1 | SINR$^{(1)}_1$ | SINR$^{(1)}_2$ | SINR$^{(1)}_3$ | SINR$^{(1)}_4$ | SINR$^{(1)}_5$ | SINR$^{(1)}_6$ | SINR$^{(1)}_7$ | SINR$^{(1)}_8$ | SINR$^{(1)}_9$ | SINR$^{(1)}_{10}$ | SINR$^{(1)}_{11}$ | SINR$^{(1)}_{12}$ |
| | ant#2 | DM | DM | DM | DM | DM | DM | DM | DM | DM | DM | DM | DM |
| | ant#3 | DM | DM | DM | DM | DM | DM | DM | DM | DM | DM | DM | DM |
| | ant#4 | DM | DM | DM | DM | DM | DM | DM | DM | DM | DM | DM | DM |
| | | 2D-DCT A3 | | | | 2D-DCT B3 | | | | 2D-DCT C3 | | |
| t$_3$ | ant#1 | SINR$^{(1)}_1$ | SINR$^{(1)}_2$ | SINR$^{(1)}_3$ | SINR$^{(1)}_4$ | SINR$^{(1)}_5$ | SINR$^{(1)}_6$ | SINR$^{(1)}_7$ | SINR$^{(1)}_8$ | SINR$^{(1)}_9$ | SINR$^{(1)}_{10}$ | SINR$^{(1)}_{11}$ | SINR$^{(1)}_{12}$ |
| | ant#2 | DM | DM | DM | DM | DM | DM | DM | DM | DM | DM | DM | DM |
| | ant#3 | DM | DM | DM | DM | DM | DM | DM | DM | DM | DM | DM | DM |
| | ant#4 | DM | DM | DM | DM | DM | DM | DM | DM | DM | DM | DM | DM |
| | | 2D-DCT A4 | | | | 2D-DCT B4 | | | | 2D-DCT C4 | | |
| t$_4$ | ant#1 | SINR$^{(1)}_1$ | SINR$^{(1)}_2$ | SINR$^{(1)}_3$ | SINR$^{(1)}_4$ | SINR$^{(1)}_5$ | SINR$^{(1)}_6$ | SINR$^{(1)}_7$ | SINR$^{(1)}_8$ | SINR$^{(1)}_9$ | SINR$^{(1)}_{10}$ | SINR$^{(1)}_{11}$ | SINR$^{(1)}_{12}$ |
| | ant#2 | DM | DM | DM | DM | DM | DM | DM | DM | DM | DM | DM | DM |
| | ant#3 | DM | DM | DM | DM | DM | DM | DM | DM | DM | DM | DM | DM |
| | ant#4 | DM | DM | DM | DM | DM | DM | DM | DM | DM | DM | DM | DM |

[Fig. 19]

| Tx antenna \ CQI band | | 1 | 2 | 3 | 4 | 5 | 6 | 7 | 8 | 9 | 10 | 11 | 12 |
|---|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

Frequency area (e.g., 5MHz) CQI band

[Fig. 20]

| CQI band / Tx antenna | | 1 | 2 | 3 | 4 | 5 | 6 | 7 | 8 | 9 | 10 | 11 | 12 | |
|---|---|---|---|---|---|---|---|---|---|---|---|---|---|---|
| $t_0$ | ant#1 | $SINR_1^{(1)}$ | $SINR_2^{(1)}$ | $SINR_3^{(1)}$ | $SINR_4^{(1)}$ | $SINR_5^{(1)}$ | $SINR_6^{(1)}$ | $SINR_7^{(1)}$ | $SINR_8^{(1)}$ | $SINR_9^{(1)}$ | $SINR_{10}^{(1)}$ | $SINR_{11}^{(1)}$ | $SINR_{12}^{(1)}$ | DCT (M×N) |
| | ant#2 | $SINR_1^{(2)}$ | $SINR_2^{(2)}$ | $SINR_3^{(2)}$ | $SINR_4^{(2)}$ | $SINR_5^{(2)}$ | $SINR_6^{(2)}$ | $SINR_7^{(2)}$ | $SINR_8^{(2)}$ | $SINR_9^{(2)}$ | $SINR_{10}^{(2)}$ | $SINR_{11}^{(2)}$ | $SINR_{12}^{(2)}$ | |
| | ant#3 | $SINR_1^{(3)}$ | $SINR_2^{(3)}$ | $SINR_3^{(3)}$ | $SINR_4^{(3)}$ | $SINR_5^{(3)}$ | $SINR_6^{(3)}$ | $SINR_7^{(3)}$ | $SINR_8^{(3)}$ | $SINR_9^{(3)}$ | $SINR_{10}^{(3)}$ | $SINR_{11}^{(3)}$ | $SINR_{12}^{(3)}$ | |
| | ant#4 | $SINR_1^{(4)}$ | $SINR_2^{(4)}$ | $SINR_3^{(4)}$ | $SINR_4^{(4)}$ | $SINR_5^{(4)}$ | $SINR_6^{(4)}$ | $SINR_7^{(4)}$ | $SINR_8^{(4)}$ | $SINR_9^{(4)}$ | $SINR_{10}^{(4)}$ | $SINR_{11}^{(4)}$ | $SINR_{12}^{(4)}$ | |
| $t_1$ | ant#1 | $SINR_1^{(1)}$ | $SINR_2^{(1)}$ | $SINR_3^{(1)}$ | $SINR_4^{(1)}$ | $SINR_5^{(1)}$ | $SINR_6^{(1)}$ | $SINR_7^{(1)}$ | $SINR_8^{(1)}$ | $SINR_9^{(1)}$ | $SINR_{10}^{(1)}$ | $SINR_{11}^{(1)}$ | $SINR_{12}^{(1)}$ | DCT (M×N) |
| | ant#2 | $SINR_1^{(2)}$ | $SINR_2^{(2)}$ | $SINR_3^{(2)}$ | $SINR_4^{(2)}$ | $SINR_5^{(2)}$ | $SINR_6^{(2)}$ | $SINR_7^{(2)}$ | $SINR_8^{(2)}$ | $SINR_9^{(2)}$ | $SINR_{10}^{(2)}$ | $SINR_{11}^{(2)}$ | $SINR_{12}^{(2)}$ | |
| | ant#3 | $SINR_1^{(3)}$ | $SINR_2^{(3)}$ | $SINR_3^{(3)}$ | $SINR_4^{(3)}$ | $SINR_5^{(3)}$ | $SINR_6^{(3)}$ | $SINR_7^{(3)}$ | $SINR_8^{(3)}$ | $SINR_9^{(3)}$ | $SINR_{10}^{(3)}$ | $SINR_{11}^{(3)}$ | $SINR_{12}^{(3)}$ | |
| | ant#4 | $SINR_1^{(4)}$ | $SINR_2^{(4)}$ | $SINR_3^{(4)}$ | $SINR_4^{(4)}$ | $SINR_5^{(4)}$ | $SINR_6^{(4)}$ | $SINR_7^{(4)}$ | $SINR_8^{(4)}$ | $SINR_9^{(4)}$ | $SINR_{10}^{(4)}$ | $SINR_{11}^{(4)}$ | $SINR_{12}^{(4)}$ | |

Frequency area (e.g., 5MHz) CQI band

[Fig. 21]

| Tx antenna \ CQI band | 1 | 2 | 3 | 4 | 5 | 6 | 7 | 8 | 9 | 10 | 11 | 12 |
|---|---|---|---|---|---|---|---|---|---|---|---|---|
| $t_0$ ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| ant#2 | $\Delta^{(2)}_1$ | $\Delta^{(2)}_2$ | $\Delta^{(2)}_3$ | $\Delta^{(2)}_4$ | $\Delta^{(2)}_5$ | $\Delta^{(2)}_6$ | $\Delta^{(2)}_7$ | $\Delta^{(2)}_8$ | $\Delta^{(2)}_9$ | $\Delta^{(2)}_{10}$ | $\Delta^{(2)}_{11}$ | $\Delta^{(2)}_{12}$ |
| ant#3 | $\Delta^{(3)}_1$ | $\Delta^{(3)}_2$ | $\Delta^{(3)}_3$ | $\Delta^{(3)}_4$ | $\Delta^{(3)}_5$ | $\Delta^{(3)}_6$ | $\Delta^{(3)}_7$ | $\Delta^{(3)}_8$ | $\Delta^{(3)}_9$ | $\Delta^{(3)}_{10}$ | $\Delta^{(3)}_{11}$ | $\Delta^{(3)}_{12}$ |
| ant#4 | $\Delta^{(4)}_1$ | $\Delta^{(4)}_2$ | $\Delta^{(4)}_3$ | $\Delta^{(4)}_4$ | $\Delta^{(4)}_5$ | $\Delta^{(4)}_6$ | $\Delta^{(4)}_7$ | $\Delta^{(4)}_8$ | $\Delta^{(4)}_9$ | $\Delta^{(4)}_{10}$ | $\Delta^{(4)}_{11}$ | $\Delta^{(4)}_{12}$ |
| $t_1$ ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| ant#2 | $\Delta^{(2)}_1$ | $\Delta^{(2)}_2$ | $\Delta^{(2)}_3$ | $\Delta^{(2)}_4$ | $\Delta^{(2)}_5$ | $\Delta^{(2)}_6$ | $\Delta^{(2)}_7$ | $\Delta^{(2)}_8$ | $\Delta^{(2)}_9$ | $\Delta^{(2)}_{10}$ | $\Delta^{(2)}_{11}$ | $\Delta^{(2)}_{12}$ |
| ant#3 | $\Delta^{(3)}_1$ | $\Delta^{(3)}_2$ | $\Delta^{(3)}_3$ | $\Delta^{(3)}_4$ | $\Delta^{(3)}_5$ | $\Delta^{(3)}_6$ | $\Delta^{(3)}_7$ | $\Delta^{(3)}_8$ | $\Delta^{(3)}_9$ | $\Delta^{(3)}_{10}$ | $\Delta^{(3)}_{11}$ | $\Delta^{(3)}_{12}$ |
| ant#4 | $\Delta^{(4)}_1$ | $\Delta^{(4)}_2$ | $\Delta^{(4)}_3$ | $\Delta^{(4)}_4$ | $\Delta^{(4)}_5$ | $\Delta^{(4)}_6$ | $\Delta^{(4)}_7$ | $\Delta^{(4)}_8$ | $\Delta^{(4)}_9$ | $\Delta^{(4)}_{10}$ | $\Delta^{(4)}_{11}$ | $\Delta^{(4)}_{12}$ |

Frequency area (e.g., 5MHz) CQI band

| CQI band / Tx antenna | | 1 | 2 | 3 | 4 | 5 | 6 | 7 | 8 | 9 | 10 | 11 | 12 |
|---|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

Frequency area (e.g., 5MHz) CQI band

Last column: 1D-DCT (applied to each row)

[Fig. 23]

| CQI band / Tx antenna | | 1 | 2 | 3 | 4 | 5 | 6 | 7 | 8 | 9 | 10 | 11 | 12 |
|---|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

Frequency area (e.g., 5MHz) CQI band

4x4 2D-DCT (applied over groups of 3 CQI bands)

[Fig. 24]

| | | 2D-DCT A1 | | | | 2D-DCT B1 | | | | 2D-DCT C1 | | |
|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

| | | 2D-DCT A2 | | | | 2D-DCT B2 | | | | 2D-DCT C2 | | |
|---|---|---|---|---|---|---|---|---|---|---|---|---|
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

| | | 2D-DCT A3 | | | | 2D-DCT B3 | | | | 2D-DCT C3 | | |
|---|---|---|---|---|---|---|---|---|---|---|---|---|
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

| | | 2D-DCT A4 | | | | 2D-DCT B4 | | | | 2D-DCT C4 | | |
|---|---|---|---|---|---|---|---|---|---|---|---|---|
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

[Fig. 25]

| CQI band / Tx antenna | | 1 | 2 | 3 | 4 | 5 | 6 | 7 | 8 | 9 | 10 | 11 | 12 |
|---|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ |

Frequency area (e.g., 5MHz) CQI band

[Fig. 26]

| CQI band / Tx antenna | | 1 | 2 | 3 | 4 | 5 | 6 | 7 | 8 | 9 | 10 | 11 | 12 | |
|---|---|---|---|---|---|---|---|---|---|---|---|---|---|---|
| $t_0$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ | DCT (M×N) |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ | |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ | |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ | |
| $t_1$ | ant#1 | $SINR^{(1)}_1$ | $SINR^{(1)}_2$ | $SINR^{(1)}_3$ | $SINR^{(1)}_4$ | $SINR^{(1)}_5$ | $SINR^{(1)}_6$ | $SINR^{(1)}_7$ | $SINR^{(1)}_8$ | $SINR^{(1)}_9$ | $SINR^{(1)}_{10}$ | $SINR^{(1)}_{11}$ | $SINR^{(1)}_{12}$ | DCT (M×N) |
| | ant#2 | $SINR^{(2)}_1$ | $SINR^{(2)}_2$ | $SINR^{(2)}_3$ | $SINR^{(2)}_4$ | $SINR^{(2)}_5$ | $SINR^{(2)}_6$ | $SINR^{(2)}_7$ | $SINR^{(2)}_8$ | $SINR^{(2)}_9$ | $SINR^{(2)}_{10}$ | $SINR^{(2)}_{11}$ | $SINR^{(2)}_{12}$ | |
| | ant#3 | $SINR^{(3)}_1$ | $SINR^{(3)}_2$ | $SINR^{(3)}_3$ | $SINR^{(3)}_4$ | $SINR^{(3)}_5$ | $SINR^{(3)}_6$ | $SINR^{(3)}_7$ | $SINR^{(3)}_8$ | $SINR^{(3)}_9$ | $SINR^{(3)}_{10}$ | $SINR^{(3)}_{11}$ | $SINR^{(3)}_{12}$ | |
| | ant#4 | $SINR^{(4)}_1$ | $SINR^{(4)}_2$ | $SINR^{(4)}_3$ | $SINR^{(4)}_4$ | $SINR^{(4)}_5$ | $SINR^{(4)}_6$ | $SINR^{(4)}_7$ | $SINR^{(4)}_8$ | $SINR^{(4)}_9$ | $SINR^{(4)}_{10}$ | $SINR^{(4)}_{11}$ | $SINR^{(4)}_{12}$ | |

Frequency area (e.g., 5MHz) CQI band

[Fig. 27]

| CQI band / Tx antenna | | 1 | 2 | 3 | 4 | 5 | 6 | 7 | 8 | 9 | 10 | 11 | 12 |
|---|---|---|---|---|---|---|---|---|---|---|---|---|---|
| $t_0$ | ant#1 | $\Delta^{(1)}_1$ | $\Delta^{(1)}_2$ | $\Delta^{(1)}_3$ | $\Delta^{(1)}_4$ | $\Delta^{(1)}_5$ | $\Delta^{(1)}_6$ | $\Delta^{(1)}_7$ | $\Delta^{(1)}_8$ | $\Delta^{(1)}_9$ | $\Delta^{(1)}_{10}$ | $\Delta^{(1)}_{11}$ | $\Delta^{(1)}_{12}$ |
| | ant#2 | $\Delta^{(2)}_1$ | $\Delta^{(2)}_2$ | $\Delta^{(2)}_3$ | $\Delta^{(2)}_4$ | $\Delta^{(2)}_5$ | $\Delta^{(2)}_6$ | $\Delta^{(2)}_7$ | $\Delta^{(2)}_8$ | $\Delta^{(2)}_9$ | $\Delta^{(2)}_{10}$ | $\Delta^{(2)}_{11}$ | $\Delta^{(2)}_{12}$ |
| | ant#3 | $\Delta^{(3)}_1$ | $\Delta^{(3)}_2$ | $\Delta^{(3)}_3$ | $\Delta^{(3)}_4$ | $\Delta^{(3)}_5$ | $\Delta^{(3)}_6$ | $\Delta^{(3)}_7$ | $\Delta^{(3)}_8$ | $\Delta^{(3)}_9$ | $\Delta^{(3)}_{10}$ | $\Delta^{(3)}_{11}$ | $\Delta^{(3)}_{12}$ |
| | ant#4 | $\Delta^{(4)}_1$ | $\Delta^{(4)}_2$ | $\Delta^{(4)}_3$ | $\Delta^{(4)}_4$ | $\Delta^{(4)}_5$ | $\Delta^{(4)}_6$ | $\Delta^{(4)}_7$ | $\Delta^{(4)}_8$ | $\Delta^{(4)}_9$ | $\Delta^{(4)}_{10}$ | $\Delta^{(4)}_{11}$ | $\Delta^{(4)}_{12}$ |
| $t_1$ | ant#1 | $\Delta^{(1)}_1$ | $\Delta^{(1)}_2$ | $\Delta^{(1)}_3$ | $\Delta^{(1)}_4$ | $\Delta^{(1)}_5$ | $\Delta^{(1)}_6$ | $\Delta^{(1)}_7$ | $\Delta^{(1)}_8$ | $\Delta^{(1)}_9$ | $\Delta^{(1)}_{10}$ | $\Delta^{(1)}_{11}$ | $\Delta^{(1)}_{12}$ |
| | ant#2 | $\Delta^{(2)}_1$ | $\Delta^{(2)}_2$ | $\Delta^{(2)}_3$ | $\Delta^{(2)}_4$ | $\Delta^{(2)}_5$ | $\Delta^{(2)}_6$ | $\Delta^{(2)}_7$ | $\Delta^{(2)}_8$ | $\Delta^{(2)}_9$ | $\Delta^{(2)}_{10}$ | $\Delta^{(2)}_{11}$ | $\Delta^{(2)}_{12}$ |
| | ant#3 | $\Delta^{(3)}_1$ | $\Delta^{(3)}_2$ | $\Delta^{(3)}_3$ | $\Delta^{(3)}_4$ | $\Delta^{(3)}_5$ | $\Delta^{(3)}_6$ | $\Delta^{(3)}_7$ | $\Delta^{(3)}_8$ | $\Delta^{(3)}_9$ | $\Delta^{(3)}_{10}$ | $\Delta^{(3)}_{11}$ | $\Delta^{(3)}_{12}$ |
| | ant#4 | $\Delta^{(4)}_1$ | $\Delta^{(4)}_2$ | $\Delta^{(4)}_3$ | $\Delta^{(4)}_4$ | $\Delta^{(4)}_5$ | $\Delta^{(4)}_6$ | $\Delta^{(4)}_7$ | $\Delta^{(4)}_8$ | $\Delta^{(4)}_9$ | $\Delta^{(4)}_{10}$ | $\Delta^{(4)}_{11}$ | $\Delta^{(4)}_{12}$ |

Frequency area (e.g., 5MHz) CQI band

DM

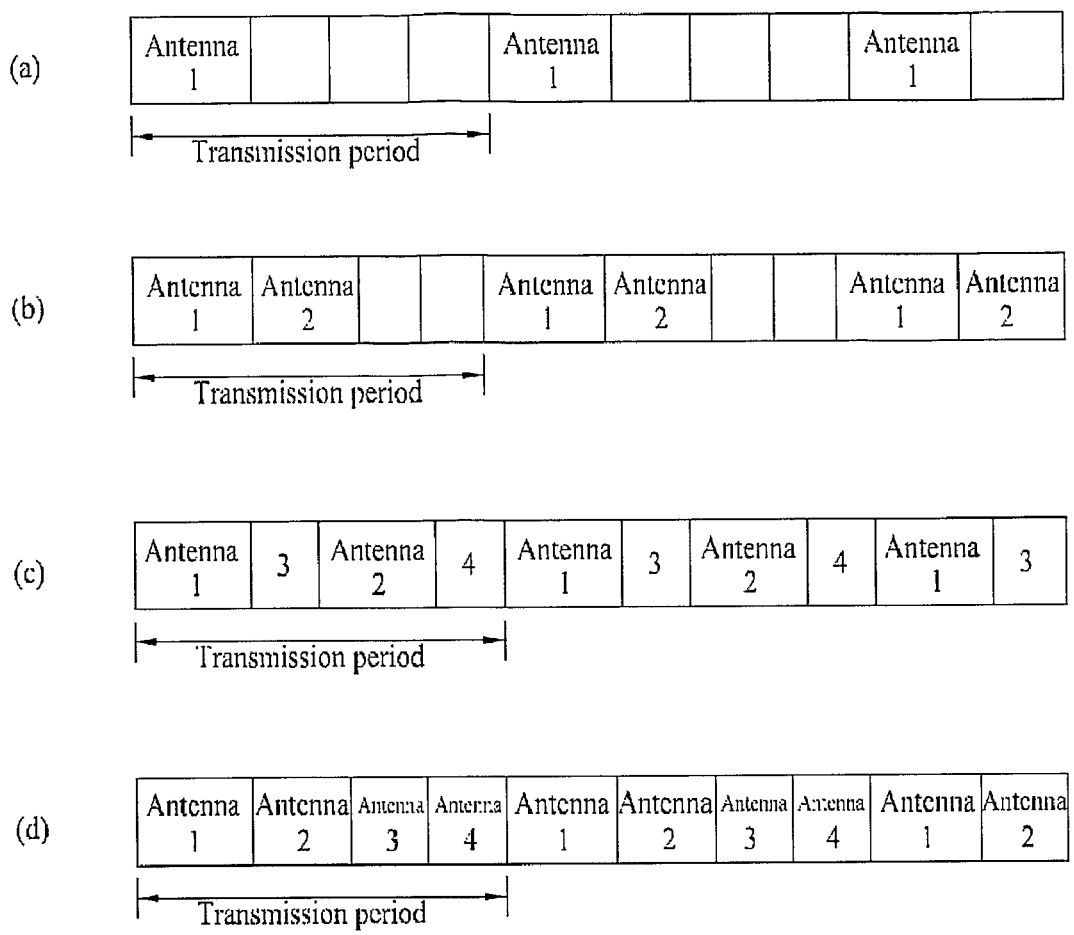
[Fig. 28]

[Fig. 29]
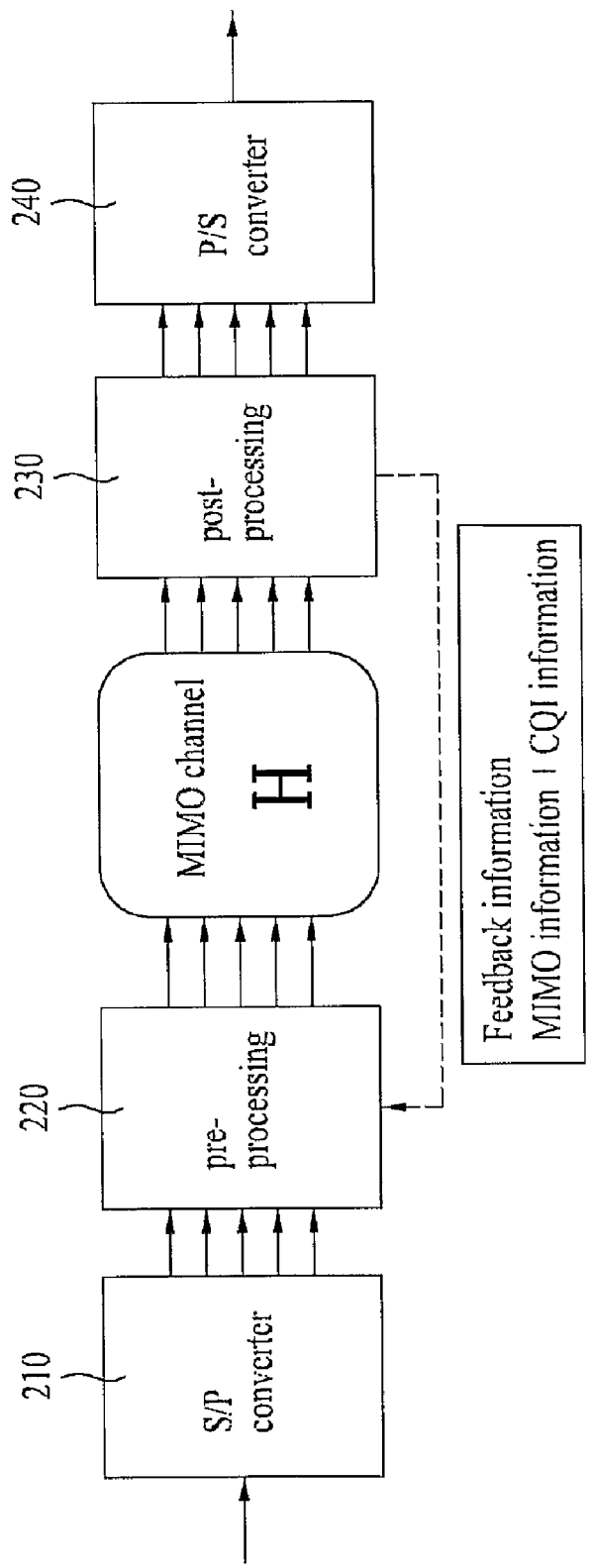

[Fig. 30]
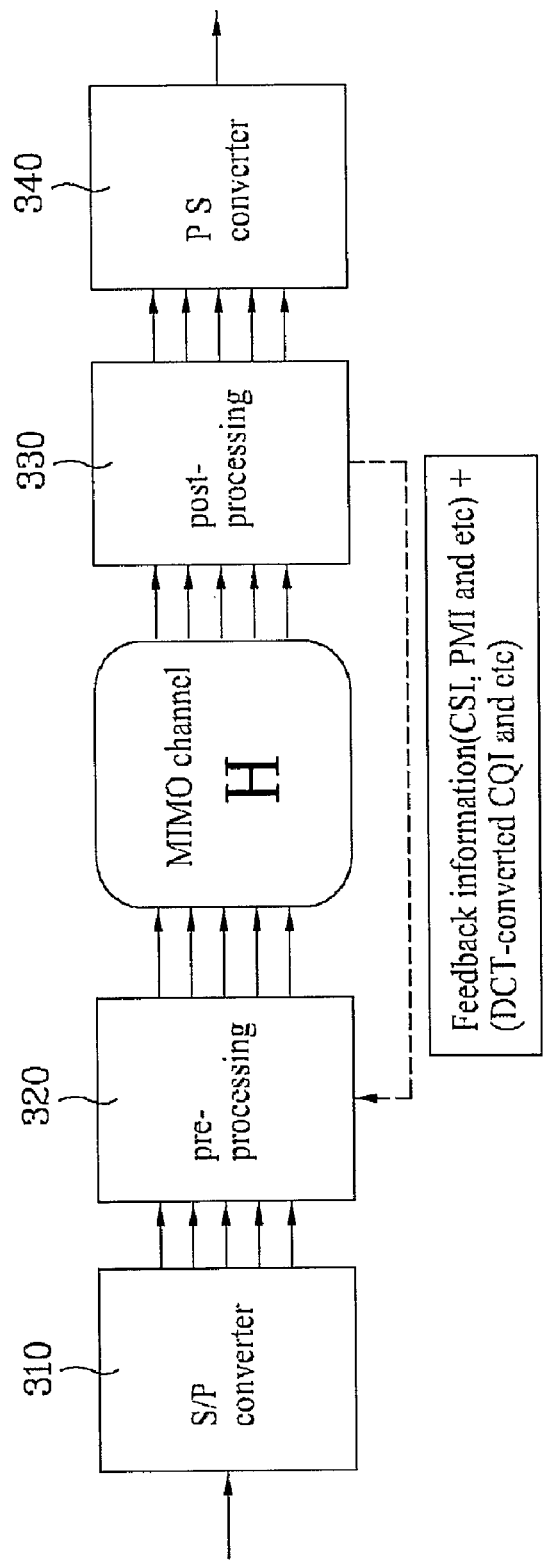

[Fig. 31]
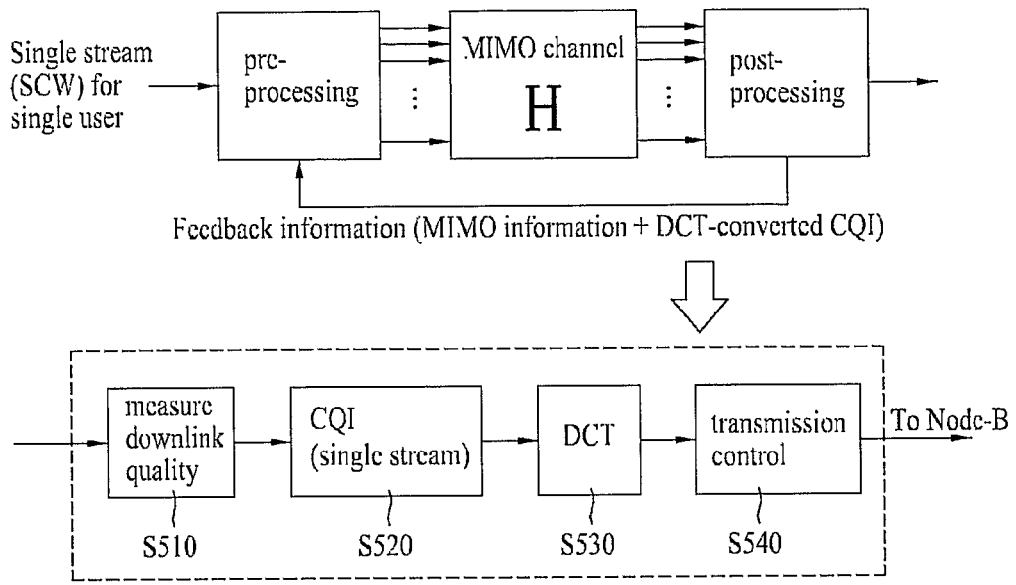
[Fig. 32]
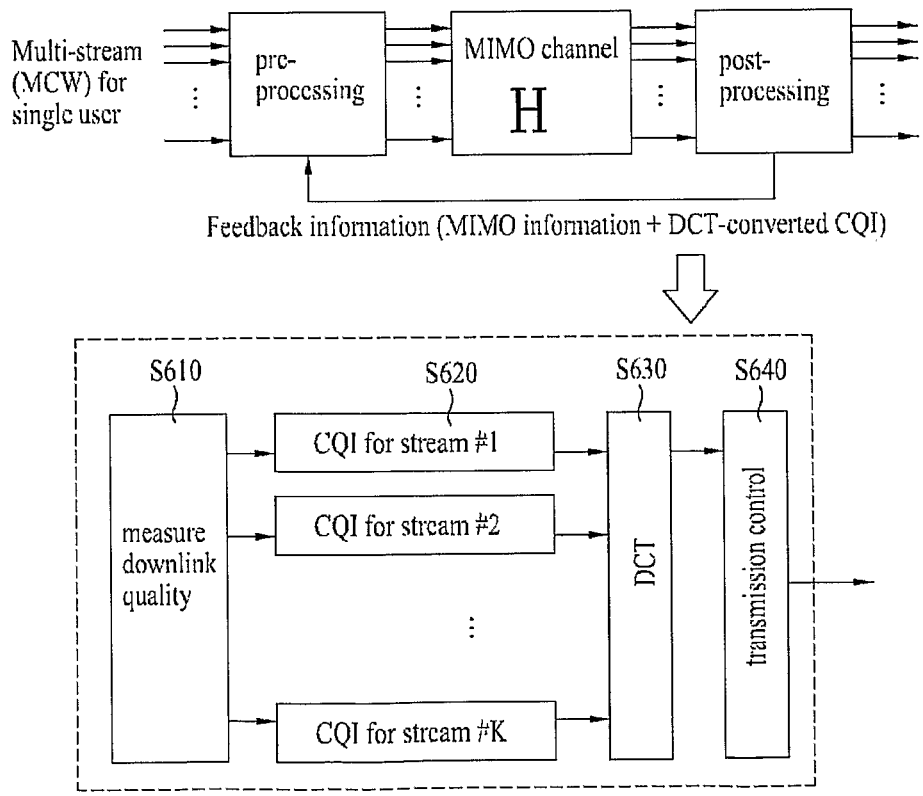

[Fig. 33]
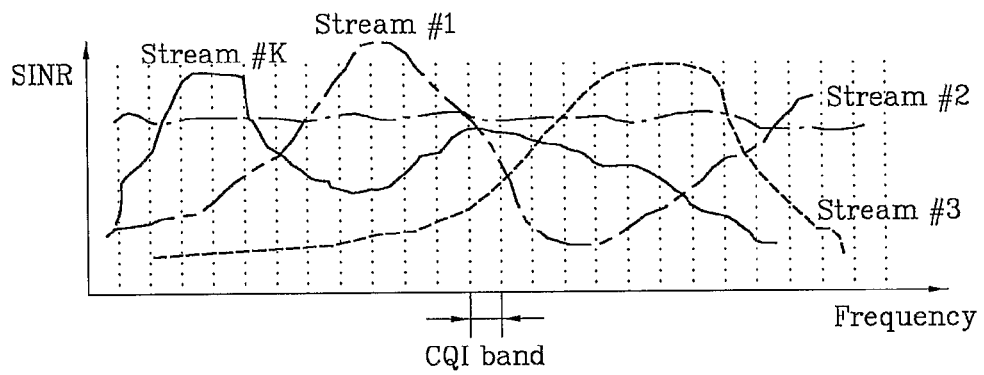
[Fig. 34]
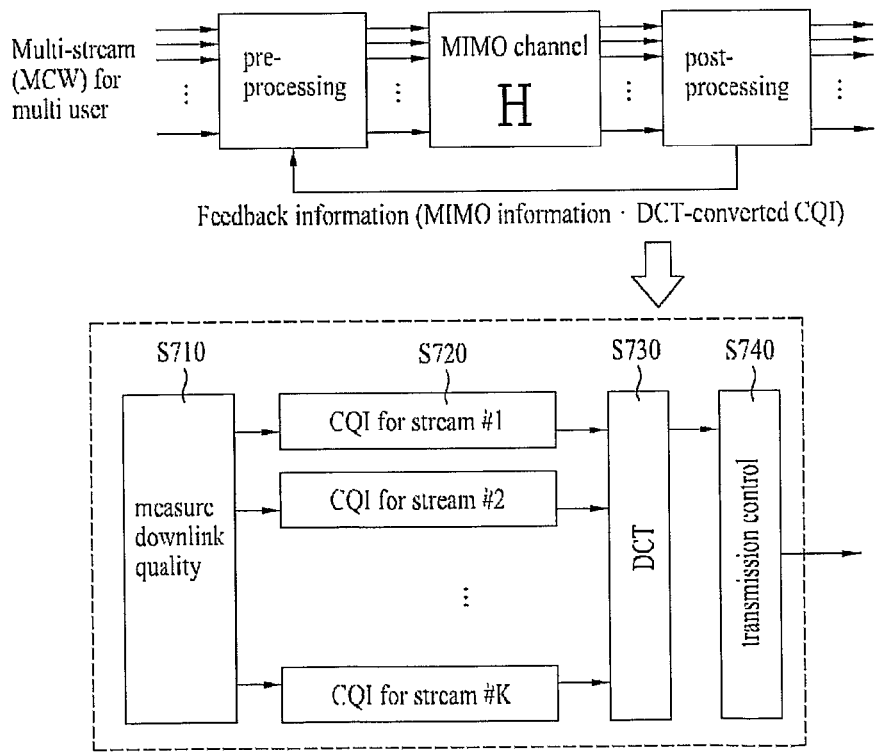

[Fig. 35]
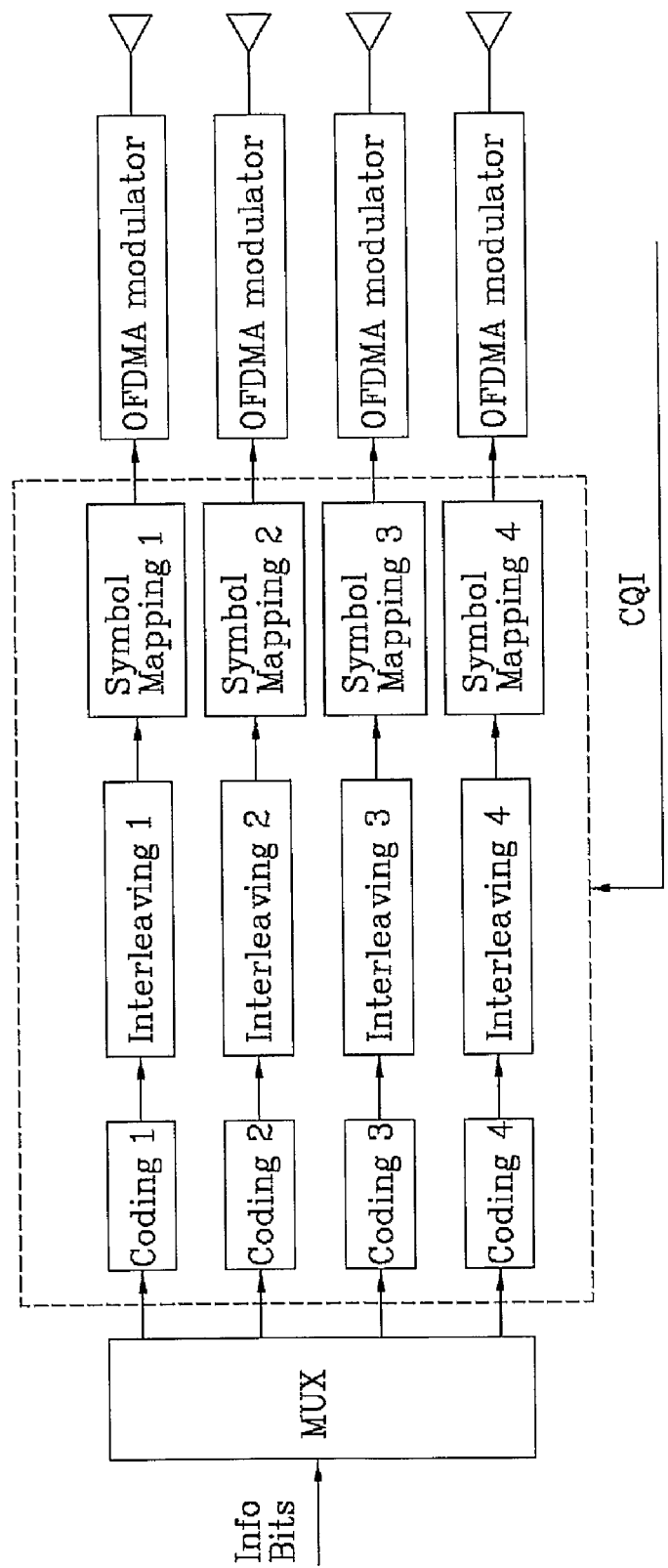

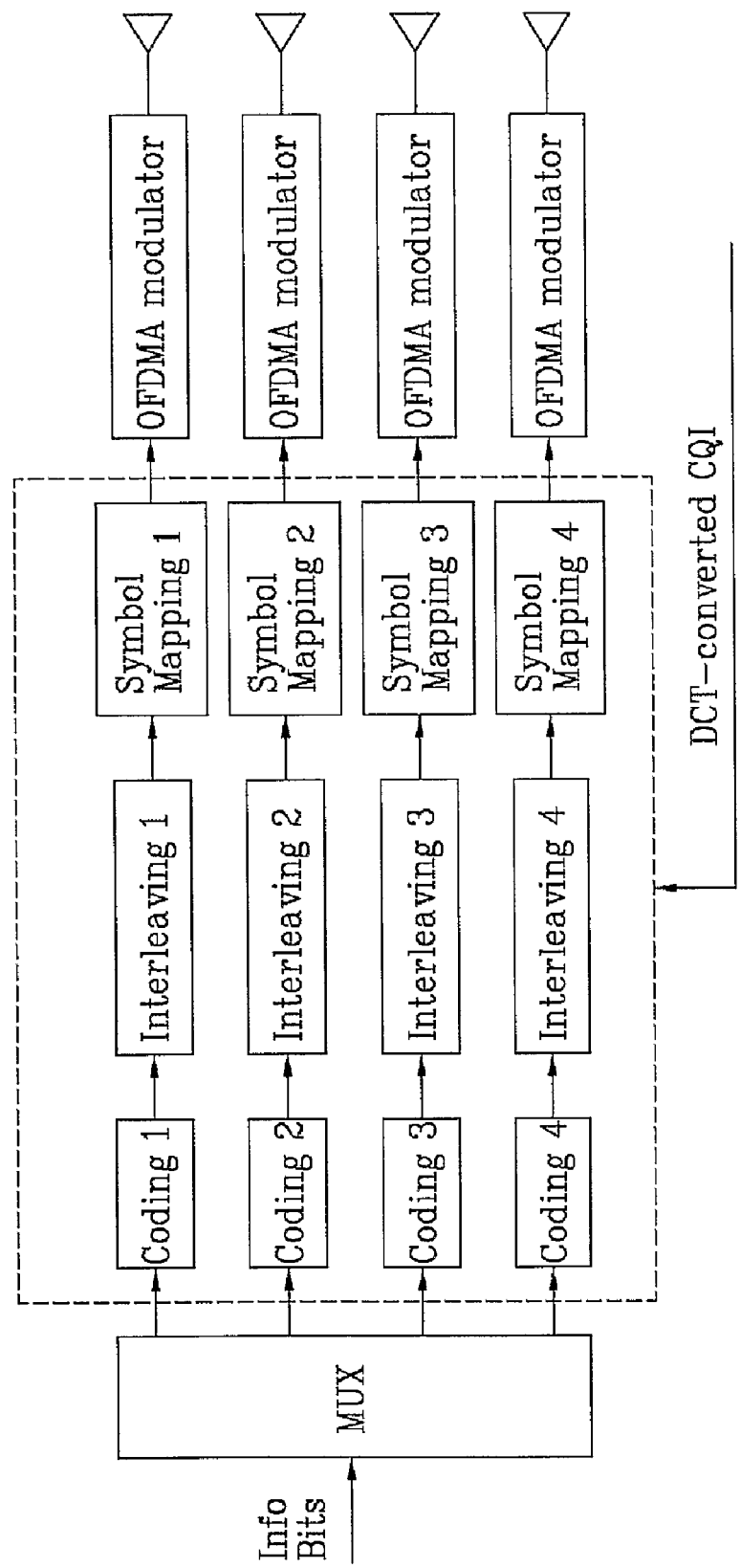
[Fig. 36]

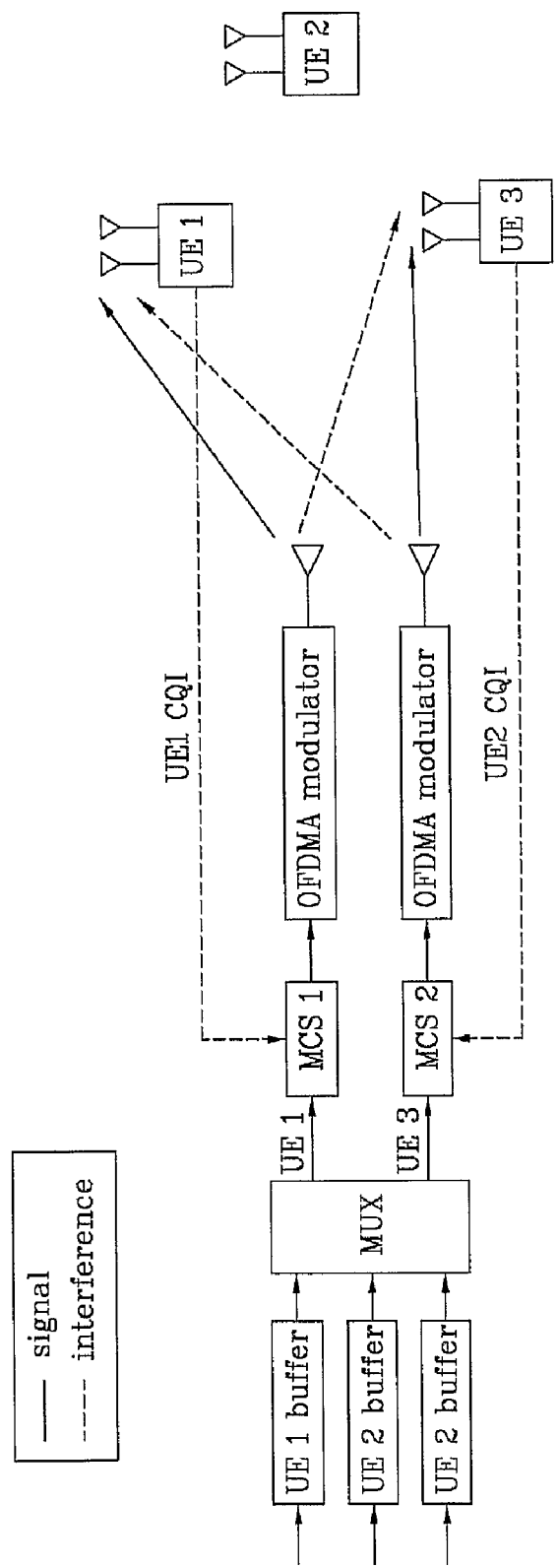
[Fig. 37]

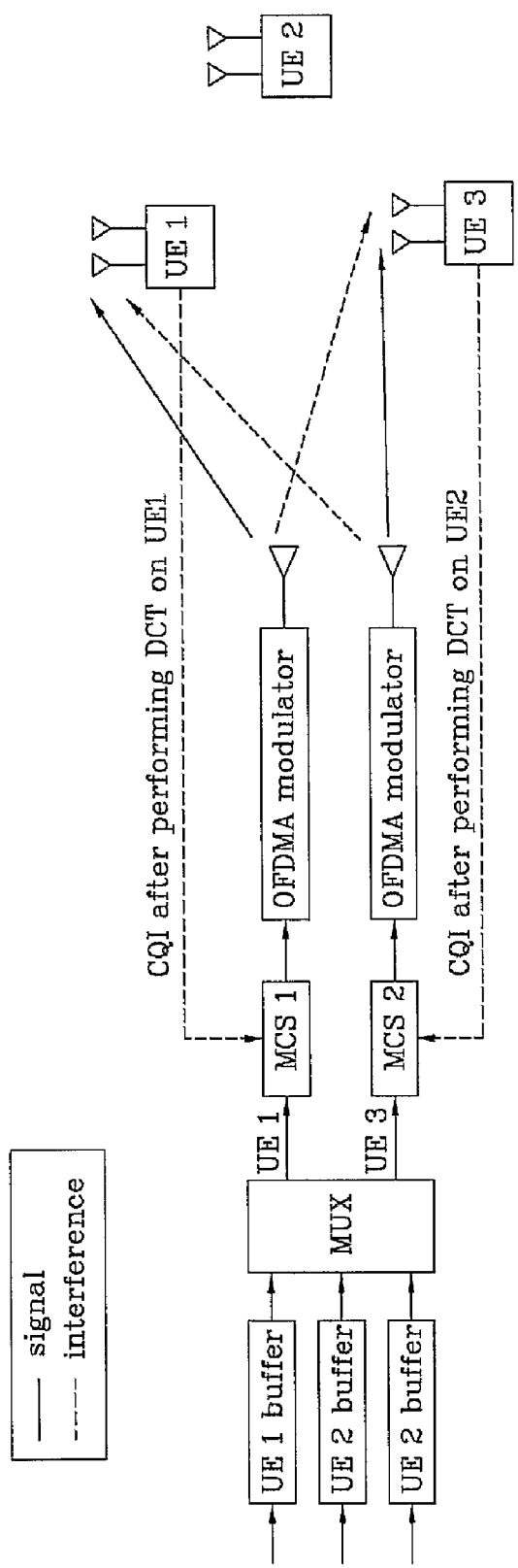
[Fig. 38]

[Fig. 39]
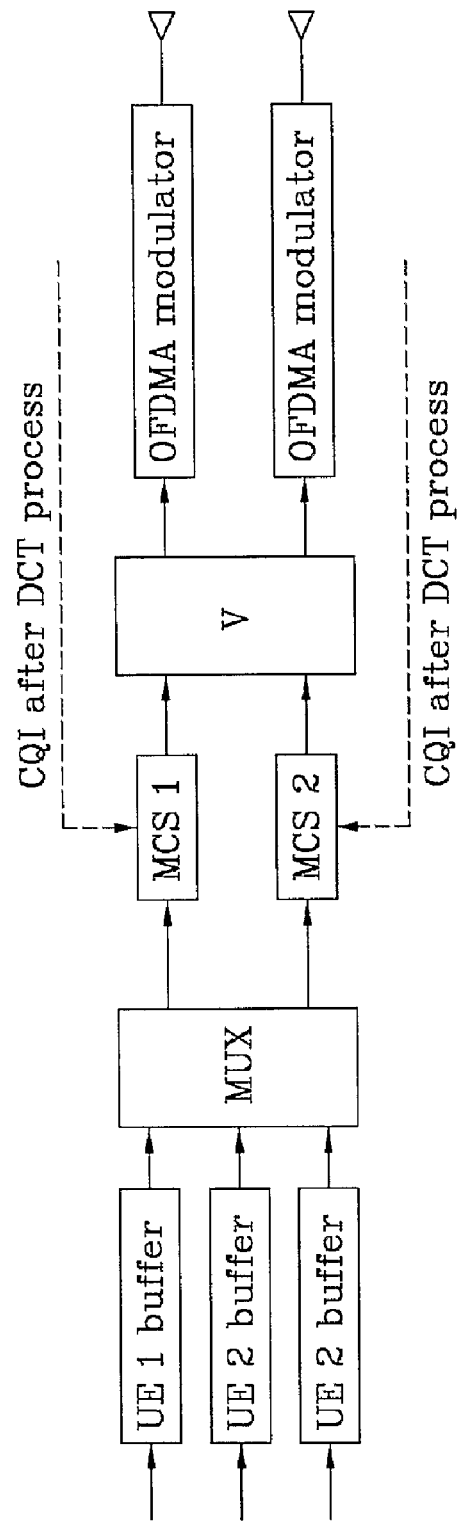

[Fig. 40]
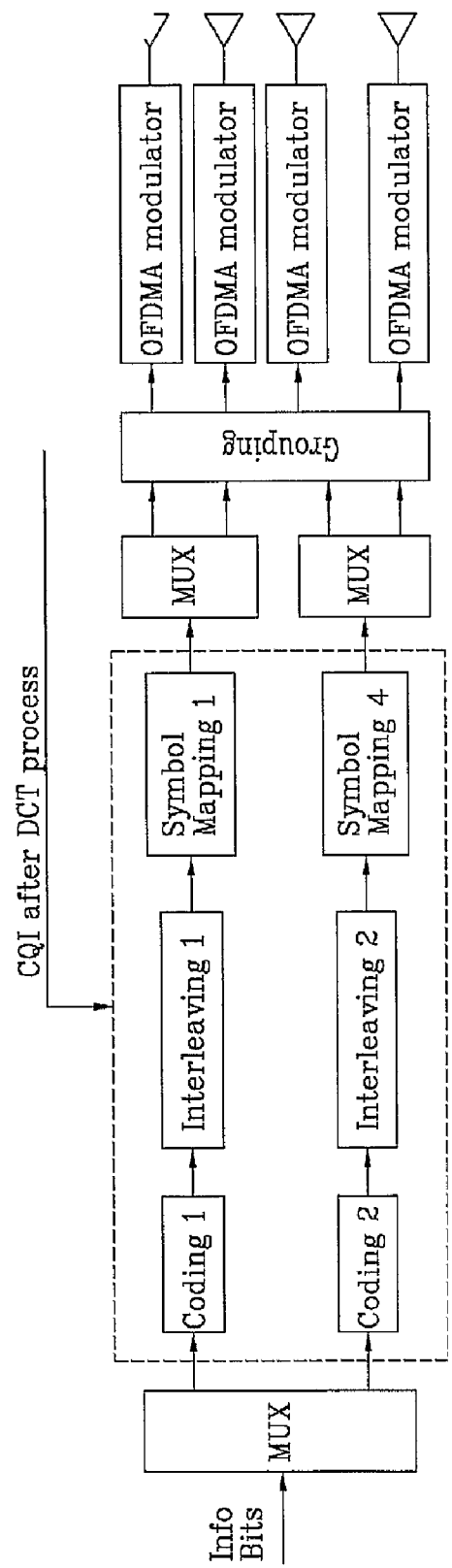

[Fig. 41]
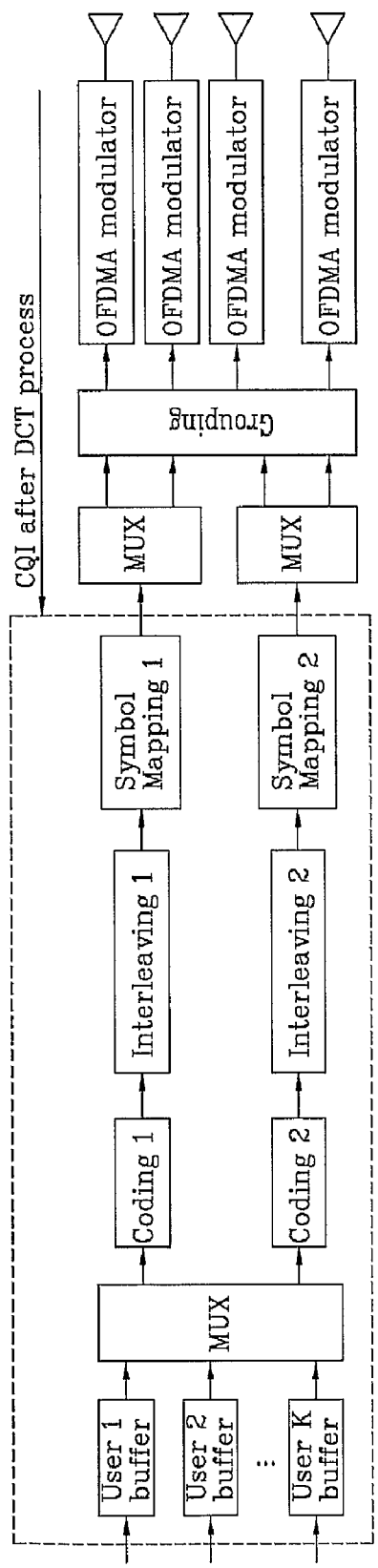

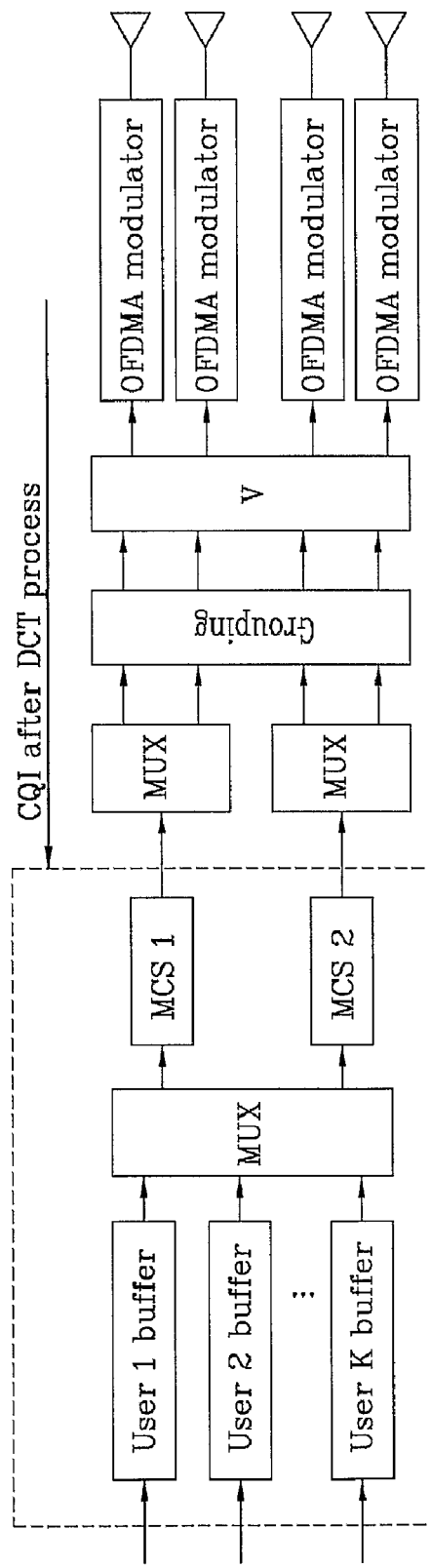
[Fig. 42]

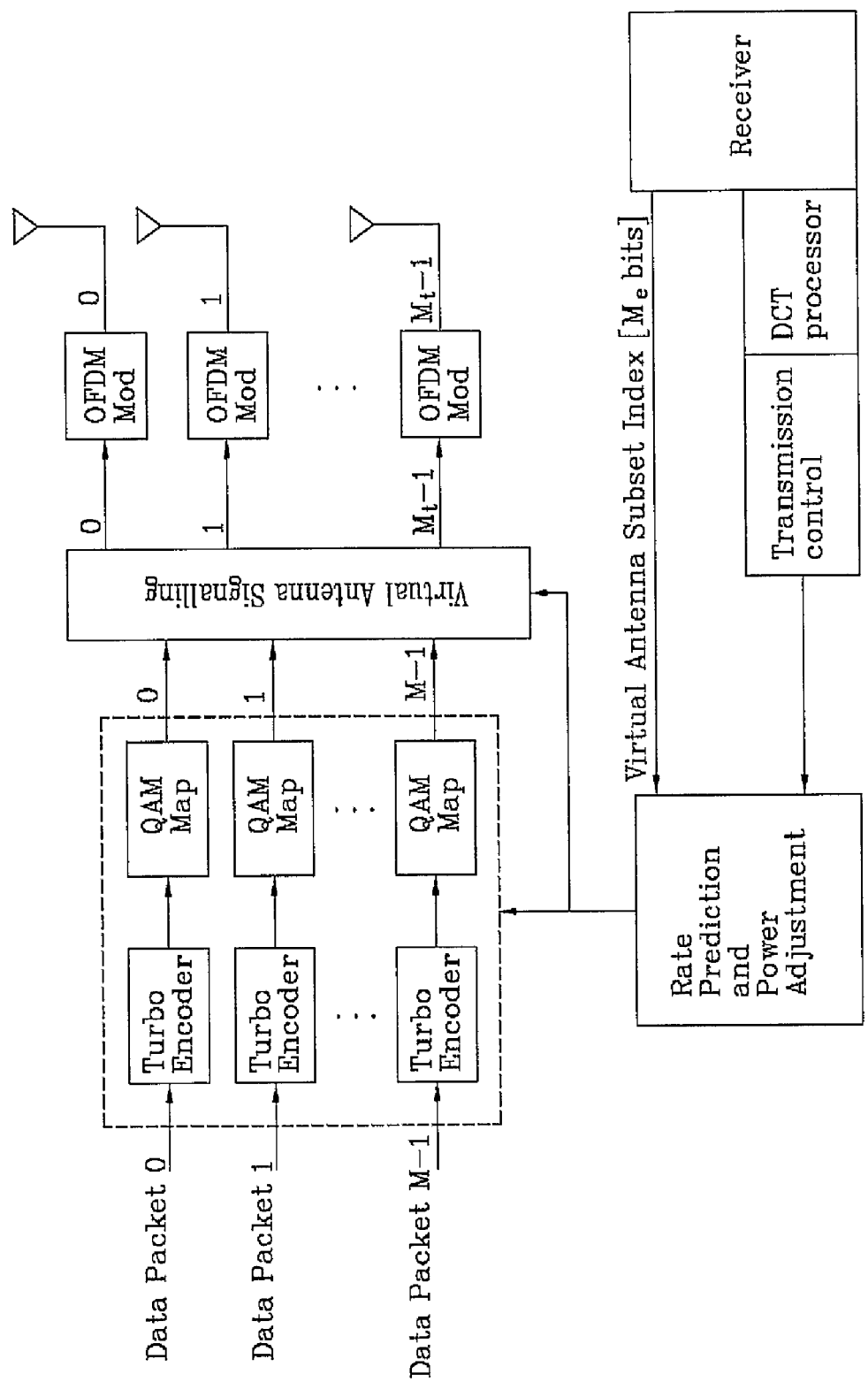
[Fig. 43]

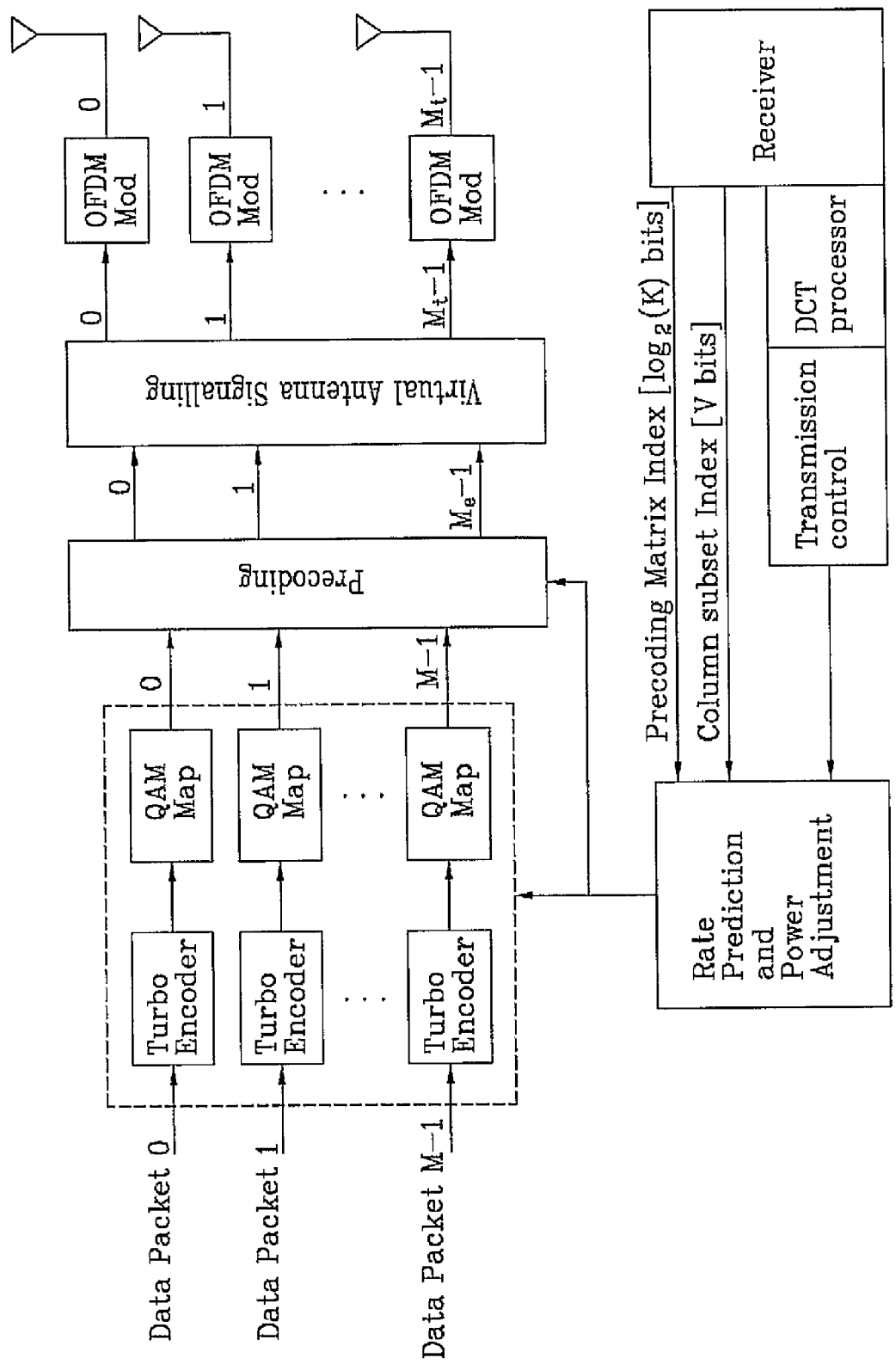
[Fig. 44]

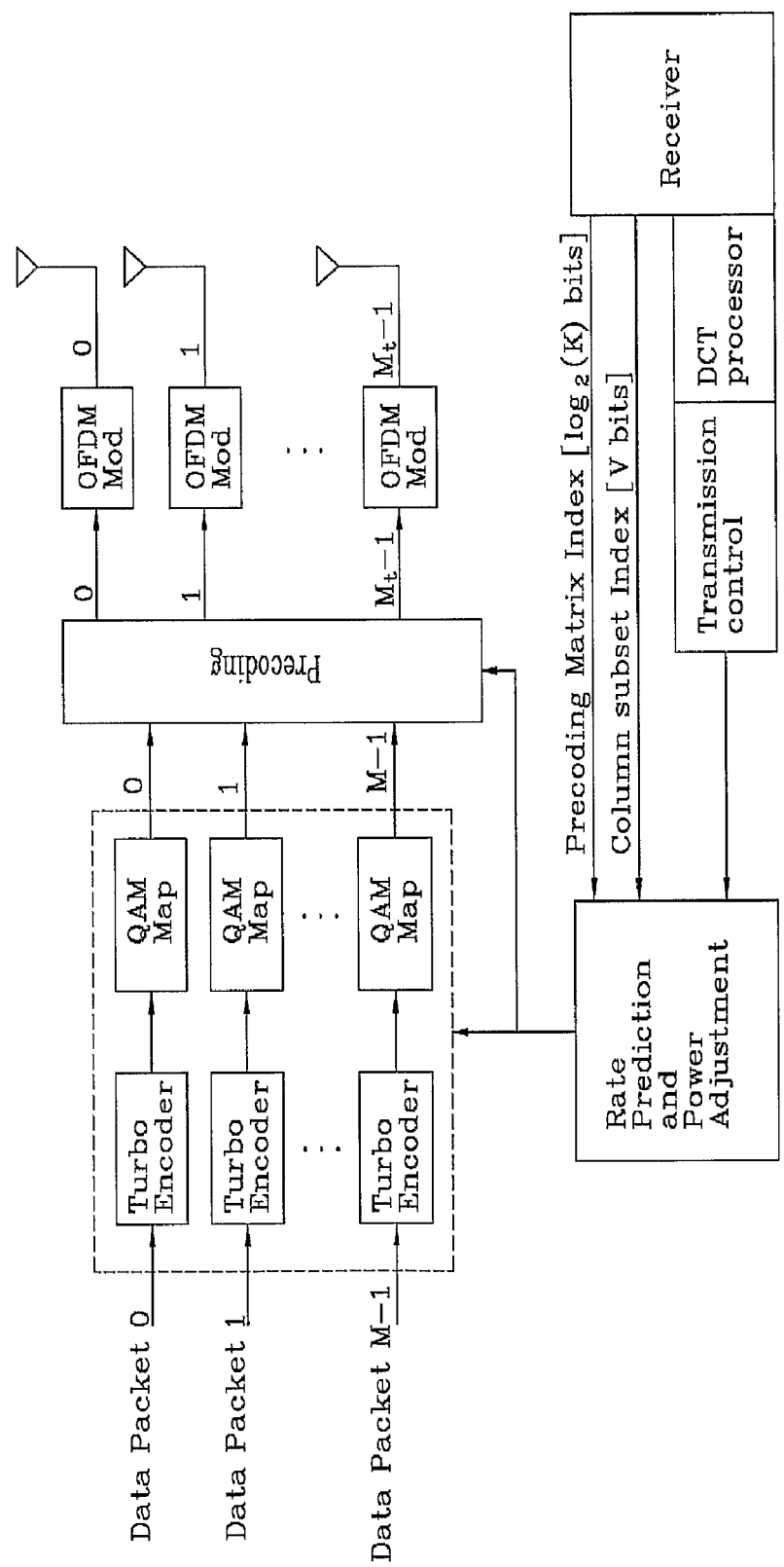
[Fig. 45]

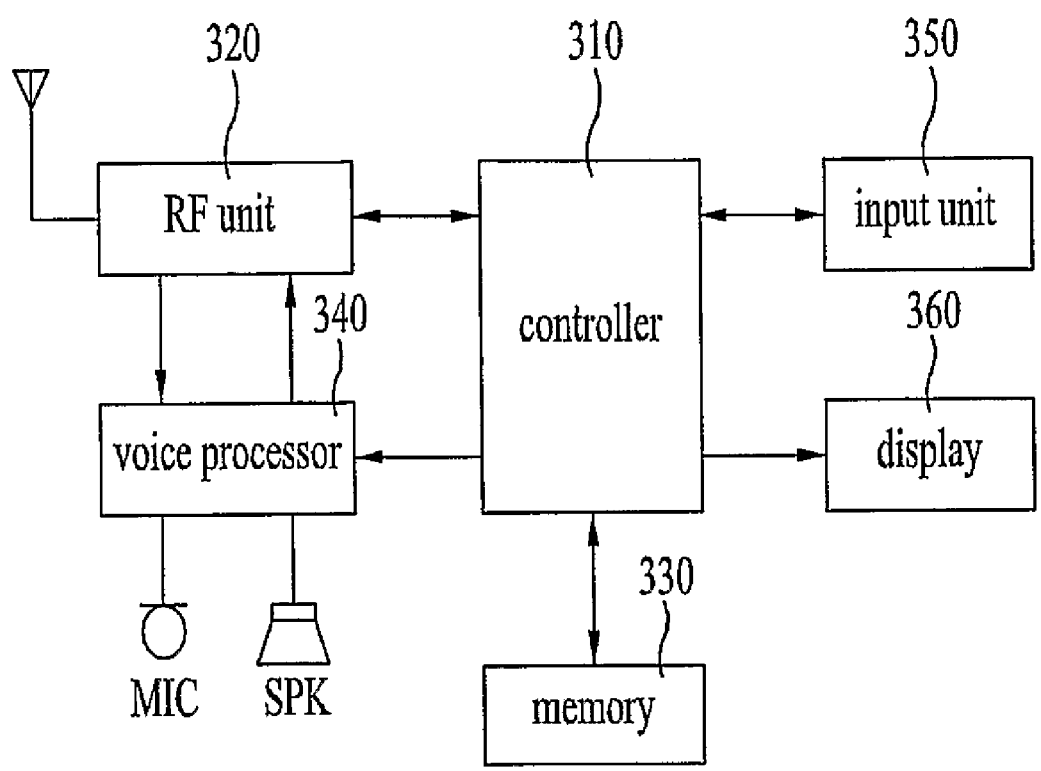
[Fig. 46]

METHOD FOR TRANSFORMING DATA, AND METHOD FOR TRANSMITTING AND RECEIVING DATA USING THE SAME

CROSS-REFERENCE TO RELATED APPLICATIONS

This application is the National Stage filing under 35 U.S.C. of International Application No. PCT/KR2007/001326, filed on Mar. 19, 2007, which claims the benefit of earlier filing date and right of priority to Korean Patent Application Nos. 10-2006-0039579, filed on May 2, 2006, 10-2006-0051443, filed on Jun. 8, 2006, 10-2006-0097400, filed on Oct. 2, 2006, and 10-2007-0001079, filed on Jan. 4, 2007, and also claims the benefit of U.S. Provisional Application Ser. Nos. 60/783,739, filed on Mar. 17, 2006, and 60/827,872, filed on Oct. 2, 2006.

TECHNICAL FIELD

The present invention relates to a method for transmitting data in a mobile communication system, and more particularly to a data transmission method for processing data on information to be transmitted, thereby minimizing an amount of the information.

BACKGROUND ART

FIG. 1 is a conceptual diagram illustrating an uplink data reporting method for use in a mobile communication system.

A variety of data can be reported to a Node-B, and a detailed description thereof will be exemplarily described with reference to CQI.

User Equipment (UE) 12 measures a downlink channel quality upon receiving signals from the Node-B 11. The User Equipment (UE) 12 reports the selected CQI value and/or a Carrier-to-Interference and Node Ratio (CINR) value to the Node-B 11 over an uplink control channel, such that the Node-B 11 can recognize the measured result. The Node-B 11 performs a variety of downlink scheduling actions using the CQI and/or CINR value, for example, UE selection and radio-resource assignment.

However, a communication system based on several frequency bands (e.g., Orthogonal Frequency Division Multiplexing (OFDM) system) is unable to accurately estimate the channel quality status of some frequency bands (i.e., a frequency band divided to acquire the CQI) contained in a total frequency band upon receipt of a single CQI report corresponding to the total frequency band. Therefore, the above-mentioned communication system is also unable to schedule a downlink of each frequency band, such that it mist receive the CQI for each frequency band.

In the meantime, a Multiple Input Multiple Output (MIMO) system based on a plurality of antennas has been developed to effectively operate the OFDM system. The MIMO system provides a transmission bandwidth, and at the same time increases an amount of the CQI to be reported to the Node-B 11. However, physical channel resources required for reporting the CQI are restricted, such that the MIMO system has difficulty in effectively transmitting the increased CQI.

In order to prevent a control-signal overhead such as the CQI from abruptly increasing, a variety of methods have been proposed as follows. A first method measures a channel quality for each unit frequency band, and transmits CQI values of only the best frequency bands from among all the frequency bands to a destination. A second method groups several frequency bands, and transmits only one average CQI to a destination. A third method reduces the CQI length.

DISCLOSURE OF INVENTION

Technical Problem

Accordingly, the present invention is directed to a method for transforming data, and a method for transmitting/receiving data using the data transforming method that substantially obviates one or more problems due to limitations and disadvantages of the related art.

An object of the present invention is to provide a method for processing data to minimize an amount of information to be transmitted to a destination (i.e., a reception side).

Another object of the present invention is to provide a method for transmitting CQI to solve the overhead increasing problem caused by CQI transmission.

Yet another object of the present invention is to provide a method for transmitting reference data, capable of increasing the accuracy of the minimized information, using a MAC signaling process in consideration of a large amount of information, transmitting the minimized information over a physical channel, and preventing the information accuracy from being deteriorated by the minimized amount of information.

Technical Solution

To achieve these objects and other advantages and in accordance with the purpose of the invention, as embodied and broadly described herein, a method for transmitting data using a Discrete Cosine Transform (DCT) in a communication system based on a plurality of sub-carriers comprising: a) performing a Discrete Cosine Transform (DCT) on first data; b) selecting a predetermined number of data from among the DCT-performed first data, and performing data processing on the selected data; and c) transmitting the data-processed resultant data to a reception side.

Preferably, the first data is created by inserting a predetermined bit into second data, or is created by puncturing a predetermined bit on the second data. Preferably, the first data is transmitted over a physical layer, and the second data is transmitted over an upper layer. Preferably, the data processing step b) includes: selecting predetermined data from among the DCT-performed first data; and quantizing the selected data.

Preferably, the data-processed resultant data is created at intervals of a transmission unit time, and the transmitting step c) includes: transmitting the data-processed resultant data created at a reference transmission unit time as reference data to the reception side; and transmitting a difference between the reference data and data-processed resultant data created at a predetermined number of transmission unit times after the lapse of the reference transmission unit time to the reception side.

Preferably, the communication system is a multi-antenna communication system employing multiple antennas, and of the method further comprises: performing a differential modulation (DM), on the basis of the data-processed resultant data of a reference antenna from among several antennas, on the data-processed resultant data of the remaining antennas; and transmitting the data-processed resultant data of the reference antenna and the DM-performed data of the remaining antennas to the reception side. Preferably, the multi-antenna communication system is a multi-antenna communication system employing multiple streams, and the first data is created for each of the multiple streams.

In another aspect of the present invention, there is provided a method for transmitting data using multiple antennas and multiple sub-carriers transmitted through each of the multiple antennas, the method comprising: a) performing a differential modulation (DM), on the basis of a data for each transmission band of a reference antenna form among the multiple antennas, on a data for each transmission band of the remaining antennas; and b) transmitting the data for each transmission band of the reference antenna and the DM-performed data for each transmission band of the remaining antennas to a reception side.

Preferably, the method further comprises: performing data processing to reduce an amount of the data for each transmission band of the reference antenna and an amount of the DM-performed data for each transmission band of the remaining antennas, prior to performing the transmitting step b). Preferably, the data processing includes at least one of a one-dimensional DCT and a two-dimensional DCT.

In yet another aspect of the present invention, there is provided a method for receiving data using an Inverse Discrete Cosine Transform (IDCT) in a communication system based on a plurality of sub-carriers, the method comprising: receiving data corresponding to scone parts of total data transmitted from a transmission side at intervals of a specific time; performing data processing on the received data, and recovering the total data; and performing the IDCT on the recovery data.

Preferably, the method further comprises: receiving control information for the data processing from the transmission side.

In yet another aspect of the present invention, there is provided a method for transforming data in a communication system based on a plurality of sub-carriers, the method comprising: inserting a predetermined bit in total transmission data or puncturing a predetermined bit on the total transmission data, and creating first data; performing a Discrete Cosine Transform (DCT) on the first data; and selecting a predetermined number of data from among the DCT-performed first data, and performing data processing on the selected data.

In yet another aspect of the present invention, there is provided a mobile terminal for transmitting/receiving data using a plurality of sub-carriers, the mobile terminal comprising: a Discrete Cosine Transform (DCT) module for performing a DCT on first data corresponding to information transmitted to a reception side; a data processing module for selecting some parts of output data of the DCT module, and performing data processing on the selected data; and a wireless module for transmitting the resultant data of the data processing module to the reception side.

In yet another aspect of the present invention, there is provided a mobile communication system for transmitting/receiving data using a plurality of sub-carriers, the mobile communication system comprising: a wireless module for receiving data corresponding to some parts of a total bitstream transmitted from a mobile terminal at intervals of a specific unit time; a data processing module for performing data processing on the received data, and recovering the total bitstream; and an Inverse Discrete Cosine Transform (IDCT) module for performing an IDCT on the recovery data.

Advantageous Effects

The present invention minimizes an amount of information to be transmitted to a reception side, transmits the minimized information, and effectively using limited wireless resources. The transmission information may be freely selected, and the present invention can be applied to a variety of technical fields. If the present invention is used to transmit the CQI, it minimizes the performance deterioration of a multi-carrier system, and sufficiently transmits the space-time-variable CQI to the Node-B using a small amount of control information. The DCT is executed on the measured CQI, some parts of the DCT coefficients are transmitted, such that an amount of overhead of feedback information transmitted to the physical channel is minimized, and can properly feed back the CQI according to the channel variation speed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a conceptual diagram illustrating an uplink data reporting procedure for use in a mobile communication system according to the present embodiment;

FIG. 2 is a conceptual diagram illustrating a method for processing information to be transmitted to a reception side according to the present embodiment;

FIG. 3 is a conceptual diagram illustrating a method for inserting additional information according to the present embodiment;

FIG. 4 is a conceptual diagram illustrating a method for determining information of a bit to be inserted according to the present embodiment;

FIG. 5 is a conceptual diagram illustrating a method for puncturing data according to the present embodiment;

FIG. 6 is a conceptual diagram illustrating a first quantization/compression method according to the present embodiment;

FIG. 7 is a conceptual diagram illustrating a second quantization/compression method according to the present embodiment;

FIG. 8 is a conceptual diagram illustrating a third quantization/compression method according to the present embodiment;

FIGS. 9~10 are conceptual diagrams illustrating a method for sequentially transmitting a predetermined number of information units contained in CQI according to the present embodiment;

FIG. 11 is a conceptual diagram illustrating a method for measuring CQI for each time unit, selecting some parts of the measured CQI, and transmitting the selected parts to a reception side according to the present embodiment;

FIGS. 12~15 are conceptual diagrams illustrating methods for transmitting CQI for each reference unit time, and transmitting an amount of variation in CQI for each unit time after the lapse of the reference unit time according to the present embodiment;

FIG. 16 shows data distributed to individual antennas for use in a data transmission method according to a first preferred embodiment of the present invention;

FIG. 17 shows data distributed to individual antennas for use in a data transmission method according to a second preferred embodiment of the present invention;

FIG. 18 shows data distributed to individual antennas for use in a data transmission method according to a third preferred embodiment of the present invention;

FIGS. 19~21 are conceptual diagrams illustrating data distributed to individual antennas for use in a data transmission method according to a fourth preferred embodiment of the present invention;

FIG. 22 shows data distributed to individual antennas for use in a data transmission method according to a fifth preferred embodiment of the present invention;

FIG. 23 shows data distributed to individual antennas for use in a data transmission method according to a sixth preferred embodiment of the present invention;

FIG. 24 shows data distributed to individual antennas for use in a data transmission method according to a seventh preferred embodiment of the present invention;

FIGS. 25~27 are conceptual diagrams illustrating data distributed to individual antennas for use in a data transmission method according to an eighth preferred embodiment of the present invention;

FIG. 28 is a conceptual diagram illustrating a data distribution transmission method commonly applied to the first to eighth preferred embodiments of the present invention;

FIG. 29 is a block diagram illustrating a general MIMO system based on an OFDM scheme according to the present embodiment;

FIG. 30 is a block diagram illustrating a transmission/reception unit of a multiple-antenna system for applying a DCT and/or DM scheme to CQI according to the present embodiment;

FIG. 31 is block diagram illustrating a method for processing feedback information when a MIMO system for a single user transmits a single codeword according to the present embodiment;

FIG. 32 is a block diagram illustrating a method for processing feedback information when a MIMO system for a single user transmits multiple codewords (MCW) according to the present embodiment;

FIG. 33 is a graph illustrating different channel environments of individual streams according to the present embodiment;

FIG. 34 is block diagram illustrating a method for processing feedback information when a MIMO system for multiple users transmits multiple codewords (MCW) according to the present embodiment;

FIG. 35 is a block diagram illustrating a transmission side for use in a conventional Palo Also Research Center (PARC) MIMO system according to the present embodiment;

FIG. 36 is a block diagram illustrating a transmission side for use in an improved Palo Also Research Center (PARC) MIMO system employing data-processed feedback information according to the present embodiment;

FIGS. 37~39 are block diagrams illustrating transmission sides for use in a Palo Also Research Center (PARC) MIMO system supporting multiple users using two transmission antennas according to the present embodiment;

FIGS. 40~42 are block diagrams illustrating a transmission side of a PGRC (Per Group Rate Control) MIMO system according to the present embodiment;

FIGS. 43~45 are block diagrams illustrating transmission sides of a S-VAP MIMO system according to the present embodiment; and FIG. 46 is a block diagram illustrating a User Equipment (UE) according to the present embodiment.

BEST MODE FOR CARRYING OUT THE INVENTION

Reference will now be made in detail to the preferred embodiments of the present invention, examples of which are illustrated in the accompanying drawings.

Prior to describing the present invention, it should be noted that the present invention relates to a method for transmitting data in a mobile communication system, such that data communication between the User Equipment (UE) and the Node-B or data communication between a first User Equipment (UE) and a second User Equipment (UE) can be effectively implemented. It is assumed that the present invention uses the User Equipment (UE) as a transmission side, uses the Node-B as a reception side, and transmits CQI over an uplink channel, however, it should be noted that the scope of the present invention is not always limited to the above mentioned assumption, and can be applied to other examples as necessary.

The mobile communication maximizes channel capacity for effectively transmitting data, and at the same time performs link adaptation between the User Equipment (UE) and the Node-B. The link adaptation is performed on the based on downlink CQI fed back from a corresponding User Equipment (UE). Individual unit frequency bands of a multiple carrier system (also called a multi-carrier system) have different CQI values, such that there is a need to feed back additional CQI for each unit frequency band. In this case, the term Unit frequency band indicates a CQI band.

For example, provided that a multi-carrier system of 5 MHz uses the frequency of 375 MHz as a basic unit of the CQI band as, a total of about 12 CQI bands may exist. In this case, provided that each CQI band has 5-bit information, an uplink control channel (e.g., CQICH) capable of transmitting a total of 60 bits (=5 bits×12) is required. Furthermore, if a multiple antenna system is applied to the above-mentioned uplink control channel, an amount of uplink channel information is further increased. In other words, an amount of information fed back to the Node-B in a multiple antenna system equipped with 4 antennas reaches 240 bits (=60 bits×4).

Therefore, the present invention provides a method for processing data for reducing an amount of overhead of feedback information, thereby minimizing an amount of data to be transmitted to a reception side. Particularly, the present invention can also provide a system including several antennas with a method for more effectively reducing an amount of feedback information.

In order to implement the above-mentioned methods, the present invention provides a variety of preferred embodiments.

A first aspect of the present invention provides a method for preventing control signal overhead (e.g., CQI) from abruptly increasing using a Discrete Cosine Transform (DCT), such that it can reduce the CQI length. A second aspect of the present invention provides a method for performing a differential modulation (DM) and a Discrete Cosine Transform (DCT) on data to be fed back to minimize an amount of feedback information for each antenna in a MIMO communication system, such that it can properly apply the DM and/or DCT according to communication situations of a corresponding system. A third aspect of the present invention provides a method for applying the above-mentioned methods to a variety of MIMO systems, for example, a single-user or multi-user MIMO system, a single-codeword (SCW) or multi-codeword (MCW) system, etc.

By the above-mentioned first to third aspects of the present invention, those skilled in the art can easily implement the inventive data transmission method of the present invention.

Firstly, the first aspect of the present invention mill hereinafter be described in detail.

FIG. 2 is a conceptual diagram illustrating a method for processing information to be transmitted to a reception side according to the present embodiment. Referring to FIG. 2, a transmission side adjusts the length of transmission information, performs the DCT, compresses the DCT resultant value, decomposes the compressed information, and transmits the decomposed information to the reception side.

A reception side inversely performs the data processing operation performed by a transmission side, such that it recovers the transmission information. In other words, the reception side assembles the transmission information decomposed by the decomposition method of the transmission side, decompress the assembled information, performs Inverse Discrete Cosine Transform (IDCT) on the decompressed information, and adjusts the length of the IDCT-performed information, thereby recovering the transmission information.

According to the one embodiment of the present invention, the transmission side may be set to a User Equipment (UE) or Node-B, and the reception side may also be set to the User Equipment (UE) or Node-B.

The transmission side and the reception side may communicate with each other using a plurality of sub-carriers orthogonal to each other. In other words, the transmission side and the reception side may communicate with each other a variety of conventional methods, for example, an OFDM (Orthogonal Frequency Division Multiplexing) method, an OFDMA (Orthogonal Frequency Division Multiplex Access) method, and a SC-FDMA (Single Carrier Frequency Division Multiple Access) method, etc. There is no limitation in the above-mentioned transmission information. The transmission information may be set to user data or control information to be transmitted to the reception side.

For the convenience of description, it is assumed that the transmission information of the present embodiment is indicative of the CQI. In the case of the CQI, the larger the bandwidth between the transmission side and the reception side, the larger the amount of information, such that there is needed an improved technique for minimizing the amount of information. The CQI may be indicative of uplink channel quality information or downlink channel quality information. For the convenience of description, the present embodiment discloses a method for transmitting the downlink channel quality information in an uplink direction. In other words, the transmission side may be indicative of the User Equipment (UE), the reception side may be indicative of the Node-B or a wireless network including the Node-B. As described above, there is no limitation in category information of the transmission information, such that the scope of the present invention is not limited to the following examples, and can also be applied to other examples as necessary.

In brief, the method of FIG. 2 may be adapted to reduce an amount of feedback information while downlink channel quality information measured by the multi-carrier system is fed back.

If the transmission information may be indicative of the uplink channel quality information, $A=\{A_1, A_2, A_3 \ldots, A_{Nrb}\}$ of FIG. 2 indicates wireless link CQI, and $N_{rb}$ is indicative of the length of the wireless link CQI.

The length adjustment block 110 of FIG. 2 adjusts the magnitude of input data to effectively perform the DCT operation. The output signal of the length adjustment block 110 is denoted by B. In more detail, the NL value of the output signal of the length adjustment block 110 indicates the length of the adjusted data, and the output signal of the length adjustment block 110 is denoted by $B=\{B_1, B_2, B_3, \ldots B_{NL}\}$.

The output signal of the length adjustment block 110 is transported to a DCT module 120. The DCT module 120 performs the DCT operation. It is well known to those skilled in the art that an amount of calculations of the DCT operation is minimized in the case that the length of the data is the square of 2. Therefore, the magnitude of the length adjustment block 110's output signal according to the present embodiment may be set to a predetermined number. Preferably, the magnitude of the length adjustment block 110's output signal may be set to a specific number denoted by the square of 2.

In other words, the DCT module 120 can receive the data of DCT input data according to system requirements.

Referring to FIG. 2, if the DCT operation is executed by the DCT module 120, the NL output values $\{C_1, C_2, C_3, \ldots C_{NL}\}$ are created. The above-mentioned NL output values may perform a variety of post-processing operations according to system environments.

Representative examples of the above-mentioned post-processing operations are a quantization process and a compression process to reduce an amount of information. The quantization/compression processes are executed by the DCT information compression module 130 receiving the output signal of the DCT module 120.

If the quantization/compression processes are performed, the NC output values $\{D_1, D_2, D_3, \ldots D_{NC}\}$ are acquired, are then used as feedback information without any change, such that they are transmitted to the reception side. However, the output signals of the DCT information compression module 130 are not transmitted to the reception side at one time, and are decomposed by an information decomposition module 140 according to a specific method.

For example, the Node-B acting as the reception side receives feedback information from the transmission side, assembles/combines the feedback information, and sequentially performs a specific process opposed to the process of the User Equipment (UE), thereby recovering the CQI.

In other words, the User Equipment (UE) may feed back single meaningful feedback information (i.e., $N_c$ information) at one time, or may disassemble the single meaningful feedback information into several units each having the proper length (i.e., $N_B$ information) at intervals of a predetermined time. If the feedback information is received at intervals of a predetermined time, the reception side must perform the assembling process to perform the IDCT. The CQI may be disassembled into several formats such that the disassembled information is transmitted, such that the above-mentioned regulation must be pre-established or pre-notified.

Preferably, the above-mentioned assembling process may be performed by the information assembling module 150 contained in the reception side. The output signal of the information assembling module 150 is applied to DCT-information inverse compression module 160 for inversely performing operations of the DCT information compression module 130. The signal estimated/recovered by the DCT-information inverse compression module 160 is applied to the IDCT module 170, such that it restores to NL data. The output signal of the IDCT module 170 is applied to the inverse length adjustment block 180 for inversely performing operations of the length adjustment block 110, such that the inverse length adjustment block 180 generates the output signal in the form of transmission information.

Detailed description of the individual blocks and modules contained in the transmission/reception sides will hereinafter be described.

The length adjustment block 110 for adjusting the length of transmission information created by the transmission side will hereinafter be described.

If the CQI length ($N_{rb}$) is not equal to the length (NL) required by a desired DCT input terminal, there is a need to adjust the $N_{rb}$ value to effectively process the DCT. For example, a specific bit may be removed or inserted to effectively process the DCT. In the case of $N_{rb}=N_L$, $\{A_1, A_2,$ $A_3, \ldots A_{Nrb}\}$ may be equal to $\{B_1, B_2, B_3, \ldots B_{NL}\}$. In this case, the length adjustment block 110 may perform no operation, or may be omitted as necessary. The length adjustment block 110 may adjust the sequence of CQI created by the specific regulation. In this case, $\{B_1, B_2, B_3, \ldots B_{NL}\}$ is created according to the adjusted sequence.

The present embodiment provides two kinds of length adjustment methods. Firstly, the first case of $N_{rb}<N_L$ will hereinafter be described.

If the $N_L$ value is higher than the $N_{rb}$ value, $\{X_1, X_2, \ldots X_{NL-Nrb}\}$ is inserted into a specific area of an original signal $\{A_1, A_2, A_3, \ldots A_{Nrb}\}$, such that the inserted result equal to the NL length is maintained.

In this case, the insertion position may be transmitted to the reception side according to a variety of methods. If the insertion position is determined by a predetermined pattern, additional control information is not transmitted to the reception side. If the insertion position is determined by the transmission side (i.e., User Equipment (UE)), additional control information of the insertion pattern indicating either position information of the inserted bit or the insertion regulation may be transmitted along with the feedback information.

The above-mentioned control information may be transmitted along with the feedback information, may be transmitted over a physical layer channel, or ray be transmitted via the MAC signaling process. In other words, the control information may be transmitted to the reception side over a first layer (Layer 1) or a second layer (Layer 2).

FIG. 3 is a conceptual diagram illustrating a method for inserting additional information according to the present embodiment. FIG. 3 shows an exemplary case in which 4 additional bits ($x_1$, $x_2$, $x_3$, and $x_4$) are inserted. As shown in FIG. 3(a), the insertion bit may be inserted into the last part of $N_{rb}$ bitstreams. As shown in FIG. 3(b), the insertion bit may be inserted into the head part of the $N_{rb}$ bitstreams. As shown in FIG. 3(c), the insertion bit may be inserted into a specific location of $N_{rb}$ bitstreams. Also, the insertion bit may be inserted at intervals of a predetermined distance, or may also be inserted at intervals of an irregular distance as denoted by FIG. 3(d).

Contents of the above-mentioned additionally-inserted bit will hereinafter be described. The example of the insertion information denoted by $X=\{X_1, X_2, \ldots X_{NL-Nrb}\}$ is as follows.

Firstly, the insertion bit may have 0 or a specific value. Also, the insertion bit may be indicative of an average value of the CQI contained in a specific bitstream. Also, the insertion bit may be set to an average value of the CQI contained in a specific bitstream. The insertion bit may be indicative of a copy of the CQI located at a specific bit. The insertion bit may be indicative of an interpolation value corresponding to a specific bitstream.

The above-mentioned insertion value may observe the predetermined regulation of the transmission/reception sides, or may observe another regulation variable with the transmission side.

If the insertion value is variably changed, control information associated with the pattern of the insertion value may be contained in the CQI, such that the CQI including the pattern control information of the insertion value may be transmitted. Otherwise, the control information may be additionally transmitted via the signaling process of the first or second layer.

FIG. 4 is a conceptual diagram illustrating a method for determining information of a bit to be inserted according to the present embodiment. In more detail, another example in which additional 4 bits ($x_0$, $x_1$, $x_2$, $x_3$) are inserted will hereinafter be described.

Referring to FIG. 4(a), the insertion bit may be indicative of an average value of a bitstream composed of $N_{rb}$ bits (i.e., 12 bits). The insertion bit may be indicative of a copy of a bit arranged at a specific location from among the $N_{rb}$ bitstreams. FIG. 4(b) shows an example in which the copied bits of 4 initial bits are copied and inserted. FIG. 4(c) shows a method for determining the insertion bit using the copies of $h_8$, $h_9$, $h_{10}$, and $h_{11}$. FIG. 4(d) shows a method for determining the values of four bits to be inserted according to an interpolation method. The four bit values are determined by interpolation of all or some of $N_{rb}$ bits.

FIGS. 3~4 show a method for inserting four bits into an information stream composed of 12 bits. Also, FIGS. 3~4 show a method for creating copies of specific bits or calculating an average value of the specific bits, thereby determining the insertion bit(s). It should be noted that the magnitude or location of the above-mentioned bits has been disclosed for illustrative purposes, the scope of the present invention is not limited to the above-mentioned examples, and can be applied to other examples.

Another example denoted by $N_{rb}>N_L$ will hereinafter be described in detail. In the case of $N_{rb}>N_L$ the CQI $A=\{A_1, A_2, A_3, \ldots A_{Nrb}\}$ punctures ($N_{rb}N_L$) values, such that it adjusts the total length to be equal to the $N_L$ value. In this case, a predetermined puncturing pattern may be used or a predetermined puncturing method may also be used. In the case of using the predetermined puncturing method, associated location information must be additionally transmitted. In the case of using the predetermined puncturing pattern, control information of the puncturing pattern mist be transmitted.

According to the aforementioned one embodiment of the present invention, control information must be contained in transmission information and be then transmitted to a destination. Otherwise, the control information may be additionally transmitted to a destination by the signaling of the physical- or upper-layer. In other words, the afore-mentioned location information can be transmitted along with the CQI, or can also be additionally transmitted by the signaling of the first- or second-layer.

FIG. 5 is a conceptual diagram illustrating a method for puncturing data according to the present embodiment.

Referring to FIG. 5, specific data bits ($h_1$, $h_4$, $h_7$, and $h_{10}$) from among 12-bit information are punctured, such that the punctured bits are not transmitted.

The inverse length adjustment block 180 according to the present embodiment inversely performs the operations of the length adjustment block 110. In other words, if the transmission side inserts specific bits, control information or predetermined pattern of the inserted bits (i.e., insertion bits) can be removed. If specific bits are punctured by the transmission side, the bitstream length may be recovered by control information or predetermined pattern of the punctured bits.

Operations of the DCT information compression module 130 will hereinafter be described.

The DCT information compression module 130 compresses the above-mentioned CQI. Namely, the DCT information compression module 130 compresses information of the output value C of the DCT module 120. The present embodiment provides three quantization/compression methods to reduce an amount of information of the output value $C=\{C_1, C_2, C_3, \ldots C_{NL}\}$.

A first method is a DCT Lowest M technique for transmitting M DCT coefficients corresponding to the lowest DCT index. A second method is a DCT significant M technique for transmitting only the most meaningful DCT coefficients. A third method is a DCT hybrid N-M technique acquired by the combination of the first method and the second method. The DCT coefficients acquired by the first to third methods may be simultaneously transmitted, or may be sequentially transmitted at intervals of a predetermined time according to a predetermined distribution regulation.

The above-mentioned DCT lowest M technique will hereinafter be described.

The DCT lowest M technique selects only M information having the lowest index number from among the DCT result $\{C_1, C_2, C_3, \ldots C_{NL}\}$, and feeds back the selected M information. Due to unique characteristics of the DCT, the DCT result assigns a meaningful value to a specific DCT corresponding to a low index. The present embodiment transmits only the M information having the lowest index number using the above-mentioned DCT characteristics. In other words, $N_c$ of FIG. 2 is equal to M and $\{C_1, C_2, C_3, \ldots C_M\}$ is equal to $\{D_1, D_2, D_3, \ldots D_{NC}\}$.

FIG. 6 is a conceptual diagram illustrating a first quantization/compression method according to the present embodiment. Referring to FIG. 6 the DCT result values for 1st to 32-th indexes exist. FIG. 6 shows an exemplary method for transmitting only the DCT result for 1st to M-th indexes. In other words, the DCT result the (M+1) indexes is discarded. FIG. 6 shows an example in which the M value is set to 7, such that the DCT result for 1st to 7th indexes is transmitted to a destination.

Basically, the variable M is set to a fixed value to minimize an amount of control information. In other words, the M value may be set to a fixed value. However, it should be noted that the M value may also be freely changed according to channel status variation, control channel capacity, terminal capacity, and QoS policy, etc. In other words, the M value may be set to a variable value. If the M value is set to the variable value, the changed information must be properly transmitted.

The M value may directly indicate a specific number of indexes (i.e., specific indexes), or may indicate a predetermined index level. For example, the M value may be set to any one of 5, 7, 10, or 15. In this case, the M value may be indicated by control information composed of 2 bits. Provided that the M value has a predetermined number of levels, the amount of additional control information can be reduced.

As described above, the method for transmitting control information according to the present embodiment may include all of a method for transmitting control information such as CQI (i.e., transmission information), a method for transmitting control information by an additional signaling process via a physical channel, and a method for transmitting control information via an upper-layer message (e.g., MAC signaling).

The example of FIG. 6 shows the transmission result of the DCT results corresponding to 1st to 7th indexes, and applies the quantization on the DCT results corresponding to the 1st to 7th indexes. As can be seen from FIG. 6 the DCT result may be denoted by a predetermined unit and be transmitted to a desired destination. Namely, the result of FIG. 6 indicates the DCT result in the form of 9 levels. There is no limitation in quantization categories applied to the present embodiment. For example, the quantization method having a large number of levels may be applied to a specific index, and the other quantization method having a small number of levels may be applied to the remaining indexes. For example, the number of bits indicating C may be different from the number of bits indicating C as necessary. In the case of using the above-mentioned quantization, the DCT result can be more accurately transmitted to a specific index.

In the meantime, the number of quantization bits may be differently established according to the importance of the DCT coefficients based on the index.

The DCT significant M technique from among three quantization/compression methods according to the present embodiment will hereinafter be described.

The DCT significant M technique enables the transmission side (i.e., User Equipment (UE)) to select the most meaningful M DCT results. In this case, in order to select the most meaningful information, the present embodiment may employ the first method for selecting M information having the highest absolute value, and the second method for selecting M information having the highest absolute value after applying different weights according to indexes.

The above-mentioned first method selects meaningful information according to absolute values of the DCT result, such that it selects the M results in the order of absolute values of the DCT result. The above-mentioned second method selects the meaningful information in consideration of the DCT-result's absolute value and its index. For example, if a high weight is applied to a specific index, the probability of selecting the specific index as the meaningful information increases.

The DCT significant M technique does not fix the location and value of the meaningful information, such that it must transmit corresponding information to the Node-B. Namely, the DCT significant M technique must include location information L of M information selected from among the bitstream C in the corresponding information, and must transmit the resultant information.

Therefore, $D=\{D_1, D_2, D_3, \ldots D_{NC}\}$ is created by combination of the location information L added to the M information selected form $C=\{C_1, C_2, C_3, \ldots C_{NL}\}$. In this case, the added location information $L=\{L_1, L_2, L_3, \ldots L_k\}$ may be configured according to two methods.

A first method arranges each location information ($L_i$) to be adjacent to individual information ($C_i$) of M or less selected from $\{C_1, C_2, C_3, \ldots C_{NL}\}$, such that it can configure a desired signal. In this case, M or less information ($C_i$) indicates a specific case in which no location information from among the partially-selected signals is required. For example, after performing the DCT operation, provided that the length of a signal is 64, M is 7 (i.e., 7 information is selected/transmitted), and $C_1$ of a specific location is always transmitted, six information (i.e., M−1=6) requires the location information. In the case of expressing the location information of each information, six location information is transmitted.

In brief, the first method always transmits the result of a specific index, and pre-establishes this regulation. For example, $C_1$ corresponding to a first index is always transmitted, such that the first method does not require additional location information for $C_1$.

However, the DCT result corresponding to the remaining indexes must always be transmitted, such that the first method transmits the location information.

However, the first method separates the location information from the resultant data. In other words, the location information is divided into DCT result units, and is then transmitted. There is no limitation in the number of DCT resultant indexes always transmitted, and there is no limitation in the number of the DCT results transmitted, such that a plurality of DCT results including a variety of indexes can be always transmitted.

The second method indicates the location pattern combination of $C_i$ values capable of being selected from $\{C_1, C_2, C_3, \ldots C_{NL}\}$ in the form of single location information L. For example, provided that the DCT result acquired after the DCT operation exists in association with 1 to 654 indexes, the M value is set to 7 (i.e., seven data is selected/transmitted), the DCT result of a first index (i.e., No. 1 index) is always transmitted, the location information required by the reception side is six information (i.e., 6=M−1). In this case, categories (i.e., the number of cases) of the location pattern of information requiring the location information from among overall information is set to $_{63}C_6$.

Therefore, in order to indicate location information of the selected information, bits of $27(=\log_2(_{63}C_6))$ are required. This value 27 is denoted by a single L value, and is then transmitted. In other words, the value of 27 can correctly notify which one of DCT results has been selected as meaningful information by the location information composed of 27 bits.

FIG. 7 is a conceptual diagram illustrating a second quantization/compression method according to the present embodiment. Referring to FIG. 7, the output signal $\{D_1, D_2, D_3, \ldots D_{NC}\}$ of the DCT information compression module 130 indicates the DCT result or location information (i.e., index information of the DCT result selected as meaningful information). Referring to FIG. 7, the DCT result exists in association with 1st to 64th indexes. As can be seen from FIG. 7, a first index is determined to be always meaningful, and the remaining 6 meaningful information is determined. There are two kinds of the method for determining the always-meaningful information, and the determined meaningful information is quantized and is then transmitted to the reception side. However, as described above, since the index of the meaningful information is variable, 6 indexes selected from 63 indexes mist be notified to the reception side.

The control information is contained in the CQI, and is then transmitted over a physical channel. Otherwise, the control information is transmitted to the reception side via the first layer signaling or the second layer signaling.

The first and second methods of FIG. 7 include the above-mentioned control information in the CQI, and transmit the CQI including the control information over the physical channel.

The first method separates the index of the DCT result selected as meaningful information from target data, and transmits the resultant data.

The second method includes 6 meaningful information in a single value and transmits the resultant value, such that the 6 meaningful information can be expressed using the single value. The number of bits, orders, and locations of the bits of FIG. 7 have been disclosed for only illustrative purposes, such that the scope of the present embodiment is not limited to detailed values, bit locations, and the order of indexes of FIG. 7, and can also be applied to other examples as necessary.

The third method (i.e., DCT Hybrid N-M technique) from among the three quantization/compression methods will hereinafter be described.

The DCT hybrid N-M technique transmits the DCT result contained in a specific interval of an overall DCT result. Particularly, the DCT hybrid N-M technique quantizes a DCT result serving as the meaningful information from among the DCT result contained in the specific interval, and transmits the quantized result. In the case of using the DCT hybrid N-M technique, the number of location information patterns to be expressed is reduced, such that the number of bits required for transmitting the location information can also be reduced. The number of indexes contained in the specific interval may be set to N and the number of meaningful information may be set to M.

For example, provided that 34(=N) DCT results from among 64 DCT results are selected and 7(=M) DCT results from among the 34 DCT results are selected, the number of cases in which 7 results from among 64 results are selected is less than the number of cases in which 7 results from among 34 results are selected, such that the number of bits required for indicating the above-mentioned case in which 7 results from among 34 results are selected is further reduced. In this case, the N value may be pre-established. In the case where the N value is variable with a variety of conditions (e.g., time), additional information for this case may be transmitted.

If the N value is variable, control information regarding the N value is transmitted. Information regarding the N value is contained in the DCT result, and is then transmitted. Otherwise, the information of the N value may be transmitted over the L1 (Layer 1) or L2 (Layer 2) message.

FIG. 8 is a conceptual diagram illustrating a third quantization/compression method according to the present embodiment. In FIG. 8 the N value is set to 34 (i.e., N=34), and the M value is set to 7 (i.e., M=7). Referring to FIG. 8 the DCT result corresponding to 1st to 34th indexes is transmitted to the reception side, and the DCT result corresponding to the 35-th or more indexes is not transmitted to the reception side. The DCT result selected as the meaningful information from among the DCT result corresponding to the 1st to 34th indexes is quantized and is then transmitted to the reception side. The method for selecting the meaningful information may be any one of the above-mentioned first and second methods, and the number of the DCT results selected as the meaningful information is set to M. For example, the DCT result corresponding to the 1st index can be always transmitted to the reception side. In this case, there is no need to transmit the location information of the 1st index to the reception side.

The example of FIG. 8 provides two methods for transmitting the location information to the reception side. A first method of FIG. 8 independently transmits the location information in DCT result units in the same manner as in the first method of FIG. 7. A second method of FIG. 8 can transmit the location information using a specific (e.g., $\log_2(_6C_{34})$ bit) may be transmitted in the same manner as in the second method of FIG. 7.

The first and second methods of FIG. 8 shows a method for including the location information in the CQI transmitted to the physical layer, and transmitting the CQI including the location information. In more detail, FIG. 8 shows a method for including information regarding N value in the CQI and transmitting the resultant CQI. The above-mentioned information regarding N may be configured in various ways.

For example, the information regarding N may be configured by various ways, for example the information regarding N may be set to the size of the N value, indexes contained in the N value, or information of indexes other than the N value.

The output signal of the DCT information compression module 130 for performing the operation of FIG. 8 is composed of $\{D_1, D_2, D_3, \ldots D_{NC}\}$, and the $D_i$ value includes the DCT result or the location information. The DCT information decompression module 160 contained in the reception side decompresses the DCT resultant value according to the control information received from the transmission side. For example, in the case of the DCT lowest M technique, the DCT information decompression module 160 receives the M value or decompresses the DCT resultant value according to a pre-determined M value.

In other words, the DCT result of (M+1) or more indexes is set to 0, the DCT result of M or less indexes is received from the transmission side, and the IDCT is performed on the received data, such that the transmission side can recover desired transmission information to be transmitted.

According to the DCT significant M technique and the DCT hybrid N-M technique, the reception side can also recover the transmission information received from the transmission side according to the above-mentioned method. In other words, the reception side can recover the received DCT result according to predetermined pattern or information, or can recover the DCT result using the received control information.

The information decomposition module 140 will hereinafter be described in detail. The information decomposition module 140 decomposes the output data of the DCT information compression module 130, and transmits the decomposed data to the reception side. If the output data of the DCT information compression module 130 is transmitted to a destination at one time, the information decomposition module 140 may not decompose the data or may be omitted as necessary.

There are a variety of methods for transmitting the output data $\{D_1, D_2, D_3, \ldots D_{NC}\}$ of the DCT information compression module 130, for example, a first transmission method, a second transmission method, and a third transmission method.

The first transmission method simultaneously transmits all of the compressed data at a predetermined unit time. The second transmission method groups the compressed data in predetermined units, and sequentially the grouping resultant data at intervals of the predetermined unit time. The third transmission method transmits compressed reference data at an initial unit time, and then transmits a difference value between the reference data and the compressed data for each unit time.

The first transmission method for transmitting the output data $\{D_1, D_2, D_3, \ldots D_{NC}\}$ of the DCT information compression module 140 simultaneously transmits the channel quality information $(D=\{D_1, D_2, D_3, \ldots D_{NC}\})$ acquired by the DCT- and compression-processes at a predetermined unit time (e.g., a transmission time interval (TTI)). In this case, the designated time interval may be variably established. Preferably, the D value acquires information on the basis of the CQI most recently acquired, and this example is considered to be a preferred embodiment. In other words, the reception side can check the channel quality using $D\{D_1, D_2, D_3, \ldots D_{NC}\}$.

For another example, the present embodiment may transmit an average value of several values acquired at a few previous TTIs. In other words, the present embodiment applies either a specific weight or a forgetting factor to a predetermined number of D values previously received, such that it can recognize the CQI.

The second transmission method from among several methods for transmitting the output data $\{D_1, D_2, D_3, \ldots D_{NC}\}$ of the DCT information compression module 130 groups the DCT-compressed CQI $(D=\{D_1, D_2, D_3, \ldots D_{NC}\})$ into specific units (e.g., overall CQI is grouped into ¼ units), and individual groups are transmitted at intervals of the unit time (e.g., TTI).

FIGS. 9~10 are conceptual diagrams illustrating a method for sequentially transmitting a predetermined number of information units contained in CQI according to the present embodiment. In more detail, FIGS. 9~10 show a method for sequentially transmitting CQI created by the DCT significant M technique at intervals of a specific time unit. In FIG. 9, an information stream composed of D1 to D9 is grouped into 4 information units, such that each information group can be transmitted during a single TTI. Similar to FIG. 9, FIG. 10 shows an example for transmitting each data for a single TTI. However, the example of FIG. 10 shows that location information of each bit is divided into several values instead of a single value. The example of FIG. 9 shows single CQI at each of four TTIs. The example of FIG. 10 shows single CQI at each of five TTIs.

According to the examples of FIGS. 9 and 10, if the channel abruptly changes with time, the CQI to be transmitted at a later time cannot correctly reflect the channel variation. Therefore, there is needed an improved method for measuring the CQI at each unit time, selects some parts of the measured CQI, and transmits the selected information to the reception side. The above-mentioned improved method will hereinafter be described as the following preferred embodiment of the present invention.

FIG. 11 is a conceptual diagram illustrating a method for measuring CQI for each time unit, selecting some parts of the measured CQI, and transmitting the selected parts to a reception side according to the present embodiment. FIG. 11 shows a preferred embodiment for transmitting $D\{=D_1, D_2, D_3, D_4, D_5, D_6, D_7, D_8, D_9\}$ including $C_1, C_2, C_3, C_4, C_5, L_2, L_3, L_4, L_5$ Referring to FIG. 11, the transmission side measures $D\{=D_1, D_2, D_3, D_4, D_5, D_6, D_7, D_8, D_9\}$, and transmits some parts of the D value (e.g., if t=0, $D_0$(i.e., $C_1$)) at each TTI. Preferably, different D values may be transmitted at individual TTIs.

In FIG. 11, if the value of t is 0, the value of $D_1$ is transmitted, If the value of t is 1, the values $D_2$ and $D_3$ are transmitted. If the value of t is 2, the values $D_4$ and $D_5$ are transmitted. If the value of t is 3, the values $D_8$ and $D_9$ are transmitted. If the value of t is 4, the values $D_2$ and $D_3$ are transmitted. The transmission pattern may be established in various ways. Preferably, neighboring TTIs may have different transmission information. The reception side updates the D value newly received at the D value previously received, performs decompression/IDCT on the updated D value, and inversely adjusts the length of the resultant data, such that it can recover the transmission information to be transmitted by the transmission side.

The example of FIG. 11 must frequently measure the CQI as compared to the examples of FIGS. 9 and 10, such that the number of calculations unavoidably increases. However, the example of FIG. 11 transmits the CQI at each TTI, such that more correct information can be transmitted to a destination. The examples of FIGS. 8 to 10 are designed to transmit some parts of total information, such that the amount of information to be transmitted to the reception side can be reduced. The above-mentioned examples of FIGS. 9~11 can be applied to the DCT hybrid N-M technique and the DCT lowest M technique.

The third transmission method from among the methods for transmitting the output signal $\{D_1, D_2, D_3, \ldots D_{NC}\}$ of the DCT information compression module 130 firstly transmits the CQI $(D=\{D_1, D_2, D_3, \ldots D_{NC}\})$ created by the DCT/compression processes as reference information, and transmits only a difference between the newly-created CQI and the reference information.

The transmission of the difference between the reference information and the difference value may be implemented by the above-mentioned first and second transmission methods from among the three methods for transmitting the output signal $\{D_1, D_2, D_3, \ldots D_{NC}\}$.

FIGS. 12~15 are conceptual diagrams illustrating methods for transmitting CQI for each reference unit time, and transmitting an amount of variation in CQI for each unit time after the lapse of the reference unit time according to the present embodiment. FIGS. 12~13 show an example in which the reference information and the difference value of the third transmission method are transmitted by the first transmission method. In more detail, the example of FIG. 12 shows a specific case in which the CQI is created by the DCT lowest M technique.

Provided that a specific condition of t=0 is a reference unit time, new CQI ($C_{1(t=0)}$, $C_{2(t=0)}$, $C_{3(t=0)}$, $C_{4(t=0)}$, and $C_{5(t=0)}$) (i.e., reference information) is created by a compression process based on both the DCT process and the DCT lowest M technique at a corresponding time. All of the reference information is transmitted to the reception side according to the first transmission method.

The DCT/compression processes are performed on the next unit time (t=1, 2, 3, . . . ). Although the new CQI (e.g., $C_{1(t=1)}$, $C_{2(t=1)}$, $C_{3(t=1)}$, $C_{4(t=1)}$, $C_{5(t=1)}$) is created, a difference (also called variation information) between the CQI acquired at the time (t=1, 2, 3, . . . ) and the reference information is transmitted to the reception side. If the variation information according to the present embodiment is set to D{=$D_1$, $D_2$, $D_3$, $D_4$, $D_5$}, the value of D can be calculated by a specific equation denoted by D=$C_{(t=1)}$−$C_{(t=0)}$.

FIG. 13 shows an example in which the CQI is created by the DCT significant M technique. If the t value is set to 0, a reference unit time is established. In this case, the DCT process and the compression process based on the DCT significant M scheme are performed at a corresponding time, such that new CQI ($C_{1(t=0)}$, $L_{2(t=0)}$, $C_{2(t=0)}$, $L_{3(t=0)}$, $C_{3(t=0)}$, $L_{4(t=0)}$, $C_{4(t=0)}$, $L_{5(t=0)}$, $C_{5(t=0)}$) is created, all of the reference information is transmitted to the reception side according to the first transmission method.

The DCT/compression processes are performed on the next unit time (t=1, 2, 3, . . . ). Although the new CQI (e.g., $C_{1(t=1)}$, $L_{2(t=1)}$, $C_{2(t=1)}$, $L_{3(t=1)}$, $C_{3(t=1)}$, $L_{4(t=1)}$, $C_{4(t=1)}$, $L_{5(t=1)}$, $C_{5(t=1)}$) is created, a difference (also called variation information) between the CQI acquired at the time (t=1, 2, 3, . . . ) and the reference information is transmitted to the reception side. If the variation information according to the present embodiment is set to D{=$D_1$, $L_2$, $D_2$, $L_3$, $D_3$, $L_4$, $D_4$, $L_5$, $D_5$}, the value of D can be calculated by equations D=$C_{(t=1)}$−$C_{(t=0)}$ and $L_{(t=1)}$=$L_{(t=0)}$.

FIGS. 14~15 show an example in which the reference information and the difference value of the third transmission method are transmitted by the second transmission method. In more detail, the example of FIG. 14 shows a specific case in which the CQI is created by the DCT significant M technique.

Provided that a specific condition of t=0 is a reference unit time, new CQI ($L_{(t=0)}$, $C_{1(t=0)}$, $C_{7(t=0)}$, $C_{8(t=0)}$, and $C_{17(t=0)}$) (i.e., reference information) is created by a compression process based on both the DCT process and the DCT significant M technique at a corresponding time. All of the reference information is transmitted to the reception side according to the second transmission method.

The DCT/compression processes are performed on the next unit time (t=1, 2, 3, . . . ). Although the new CQI (e.g., $L_{(t=1)}$, $C_{1(t=1)}$, $C_{7(t=1)}$, $C_{8(t=1)}$, and $C_{17(t=1)}$) is created, a difference (also called variation information) between the CQI acquired at the time (t=1, 2, 3, . . . ) and the reference information is transmitted to the reception side. If the variation information according to the present embodiment is set to D {=$D_1$, $D_2$, $D_3$, $D_4$, $D_5$}, the value of D can be calculated by a specific equation denoted by $D_1$=L and $D_{2\sim4}$=$C_{2\sim4(t=1)}$−$C_{2\sim4(t=0)}$. In this case, the value of $D_1$ may not be changed to another value as necessary, and may be omitted during the transmission of the variation information. If the value of $D_1$ is changed to another value, reference information at the corresponding time mist be re-transmitted.

FIG. 15 shows another example of the aforementioned case in which the CQI is created by the aforementioned DCT significant M technique.

Provided that a specific condition of t=0 is a reference unit time, new CQI ($C_{1(t=0)}$, $L_{2(t=0)}$, $C_{2(t=0)}$, $L_{3(t=0)}$, $C_{3(t=0)}$, $L_{4(t=0)}$, $C_{4(t=0)}$, $L_{5(t=0)}$, and $C_{5(t=0)}$) (i.e., reference information) is created by a compression process based on both the DCT process and the DCT significant M technique at a corresponding time. All of the reference information is transmitted to the reception side according to the second transmission method.

The DCT/compression processes are performed on the next unit time (t=1, 2, 3, . . . ). Although the new CQI (e.g., $C_{1(t=1)}$, $L_{2(t=1)}$, $C_{2(t=1)}$, $L_{3(t=1)}$, $C_{3(t=1)}$, $L_{4(t=1)}$, $C_{4(t=1)}$, $L_{5(t=1)}$, and $C_{5(t=1)}$), a difference (also called variation information) between the CQI acquired at the time (t=1, 2, 3, . . . ) and the reference information is transmitted to the reception side.

If the variation information according to the present embodiment is set to $D_1${=$D_1$, $L_2$, $D_2$, $L_3$, $D_3$, $L_4$, $D_4$, $L_5$, $D_5$}, the value of D can be calculated by a specific equation denoted by $D_{1,2,4,6,8}$=$L_{1,2,4,6,8}$, $D_{3,5,7,9}$=$C_{3,5,7,9(t=1)}$−$C_{3,5,7,9(t=0)}$. In this case, the value of $D_{1,2,4,6,8}$ may not be changed to another value as necessary, and may be omitted during the transmission of the variation information. If the value of $D_{1,2,4,6,8}$ is changed to another value, reference information at the corresponding time must be re-transmitted.

The above-mentioned third transmission method simultaneously transmits the reference information according to the first transmission method, however, the above-mentioned variation information may be divisionally transmitted according to the second transmission method. There is a need to transmit the reference information at a corresponding time on the condition that the channel condition or communication environment is changed. In this case, the reference information may be re-transmitted at intervals of a predetermined time, may be re-transmitted by a request of the reception side, and may also be re-transmitted by the scheduling process of the transmission side. At least two of the above-mentioned re-transmission methods may be applied to the present embodiment as necessary.

Preferably, the reference information having a relatively large amount of information may be transmitted over the physical layer or the MAC layer, or may be transmitted over only the MAC layer. However, the scope of the present invention is not limited to the physical and MAC layers, and may transmit both the reference information and the variation information to the physical or MAC layer.

The method for divisionally transmitting the reference information and the variation information ray also be equally transmitted to the CQI acquired prior to the compression process. The above-mentioned examples of the first preferred embodiment of the present invention minimizes the magnitude of the transmission information, and transmits the minimized information, such that it can effectively employs limited wireless resources. The above-mentioned transmission information ray be a variety of information, such that it can be applied to a variety of technical fields. Particularly, if the above-mentioned examples are transmitted to transmit the CQI, they can minimize a deterioration of performance of the multi-carrier system, and at the same time can sufficiently transmit the CQI varying with time-frequency dins to the Node-B using only a small amount of control information.

In other words, the DCT is performed on the measured CQI to acquire the DCT coefficients, sane parts of the DCT coefficients are transmitted to minimize an amount of overhead of feedback information transmitted to the physical channel, and the CQI can properly be fed back according to a channel variation speed.

The second aspect of the present invention will hereinafter be described in detail. The second aspect of the present invention performs the DM- and/or DCT-processes on feedback data to minimize an amount of feedback information for each antenna in the MIMO communication system, and can properly employ the DM and/or DCT processes according to a communication situation of a corresponding system.

A second aspect of the present invention shows a variety of preferred embodiments classified according to the DM and/or DCT processes in the multi-antenna system equipped with four antennas or the multi-carrier system. However, the scope of the present invention is not limited to the above-mentioned preferred embodiments, and can be readily modified by those skilled in the art according to the DM or DCT process.

First Preferred Embodiment

The first preferred embodiment performs the DM process on the CQI for each CQI band of 2nd to 4th antennas (ant#2~ant#4) corresponding to the CQI for each CQI band of a first antenna (ant#1, reference antenna).

FIG. 16 shows data distributed to individual antennas for use in a data transmission method according to a first preferred embodiment of the present invention.

In this case, if $SINR^{(i)}_{(j)}$ is set to CQI of the j-th CQI band of the i-th antenna, the value $DM(\Delta^{(2)}_{(j)})$ of the second antenna is denoted by $\Delta^{(2)}_{(j)} = SINR^{(2)}_{(j)} - SINR^{(1)}_{(j)}$. In this case, the DM process of the 2nd to 3rd antennas may be differentiated by the first antenna as shown in FIG. 16 or may be differentiated by a previous antenna of the first antenna. If the DM process is differentiated by the previous antenna, a multi-antenna demodulator of a successive interference cancellation (SIC) scheme is established, such that this case is very useful to a specific case in which the demodulated SINR value is pre-established in the order of $SINR^{(1)}_{(j)} < SINR^{(2)}_{(j)} < SINR^{(3)}_{(j)} < SINR^{(4)}_{(j)}$. In the meantime, the CQI $(SINR^{(1)}_{(1)} \sim SINR^{(1)}_{(12)})$ of the first antenna may be DCT-processed in a single dimension. In this case, the DCT-processed result is quantized/compressed and is then transmitted to the Node-B.

Second Preferred Embodiment

The second preferred embodiment performs the antenna-area DM process of the first preferred embodiment, performs a 2D-DCT (2 Dimensional-Discrete Cosine Transform) process on all the SINR values of overall CQI bands of all the antennas, thereby minimizing an amount of information.

FIG. 17 shows data distributed to individual antennas for use in a data transmission method according to a second preferred embodiment of the present invention. FIG. 17 shows data distribution for each antenna in the case of the 2D-DCT process of 4×4 units. In this case, the 2D-DCT process is not always limited to the 4×4 units, and a variety of units can be applied to the 2D-DCT process according to communication situation, the number of antennas, and the number of CQI bands, etc.

The second preferred embodiment is more useful to the case in which the degree of corresponding between frequency bands of individual antennas is high, and when applied to that case, resulting in the minimized compression rate of transmission data.

Third Preferred Embodiment

The third preferred embodiment performs the CQI measurement and the antenna-area DM process of the first preferred embodiment a predetermined number of times at intervals of a specific time (e.g., sub-frame of 0.5 ms units), collects the execution results, configures M×N matrix for each antenna, performs the 2D-DCT process on the matrix, and transmits the 2D-DCT result to the reception side. In this case, the size of the matrix may be determined in various ways according to the number of antennas, the number of CQI bands, and the number of unit execution times, etc.

The UE of the transmission side includes a plurality of buffers corresponding to the number of the execution times, each buffer temporarily stores the result of each execution time.

If the matrix is implemented with the 4×4 matrix, the matrix for the first antenna is as follows:

$$A = \begin{bmatrix} A1 \\ A2 \\ A3 \\ A4 \end{bmatrix} B = \begin{bmatrix} B1 \\ B2 \\ B3 \\ B4 \end{bmatrix} C = \begin{bmatrix} C1 \\ C2 \\ C3 \\ C4 \end{bmatrix}$$

FIG. 18 shows data distributed to individual antennas for use in a data transmission method according to a third preferred embodiment of the present invention.

In the case of analyzing the above-mentioned matrix using the data distribution for each antenna for FIG. 18, A1~A4 indicate the CQI of the first to fourth CQI bands, B1~B4 indicate the CQI of the fifth to eighth CQI bands, and C1~C4 indicate the CQI of the 9th to 12th CQI bands.

Although not shown in FIG. 18, the A, B, and C matrixes can be equally applied to 2nd to 4-th antennas. In this case, the matrix constituent components of the 2nd to 4th antennas are the DM-processed SINR value, whereas the matrix constituent component of the first antenna is a 2D-DCT-processed SINR value.

The third preferred embodiment can be more usefully applied to a case which has a high correlation time in a time domain between individual antennas, such that has a little CQI variation.

Fourth Preferred Embodiment

FIGS. 19~21 are conceptual diagrams illustrating data distributed to individual antennas for use in a data transmission method according to a fourth preferred embodiment of the present invention.

The fourth preferred embodiment transmits the DM- and/or DCT-processed CQI (first data, See FIG. 19) in the same manner as in the first preferred embodiment, and further transmits reference information (second data, See FIGS. 20 and 21) acting as a basis of error rate measurement or error correction of the first data. In this case, the second data may be transmitted at intervals of a predetermined transmission period, or may be triggered according to specific events generated by the transmission- or reception-side. If the second data is transmitted at intervals of a predetermined period, it is preferable that the transmission period of the second data may be longer than that of the first data.

The second data is used as reference information, such that an amount of the second data is relatively large. However, it is preferable that the DM process having a high error rate during the transmission process may not be applied to the second data (See FIG. 21). The 2D-DCT process of a predetermined unit can be selectively applied to the second data (See FIG. 20), because it can compress data with low error rate.

In the meantime, the first data having a relatively small amount of information is transmitted via the physical channel, and the second data having a large amount of transmission may be simultaneously transmitted via the MAC signaling process, instead of being divisionally transmitted via the physical channel several times.

The first to fourth preferred embodiments select an antenna having minimum-sized CQI as the first antenna, such that the selected antenna is used as a basis of the DM process. Otherwise, the first to fourth preferred embodiments may select a predetermined antenna from among several antennas as necessary. According to the predetermined order established for each antenna, the first antenna may be periodically changed (ant#1→ant#2→ant#3→ant#4→ant#1 . . . ).

Fifth Preferred Embodiment

FIG. 22 shows data distributed to individual antennas for use in a data transmission method according to a fifth preferred embodiment of the present invention.

The fifth preferred embodiment performs the DCT process on the CQI of all the antennas (ant#1~ant#4), however, the additional DM process is not performed on the CQI. In this case, the 1D-DCT (1 Dimensional-Discrete Cosine Transform) corresponding to all the CQI bands of individual antennas may be performed on the CQI ($SINR^{(i)}_{(1)}$~$SINR^{(i)}_{(12)}$). FIG. 22 shows the data distribution for each antenna when the ID-DCT process is performed for each antenna.

Sixth Preferred Embodiment

FIG. 23 shows data distributed to individual antennas for use in a data transmission method according to a sixth preferred embodiment of the present invention.

The sixth preferred embodiment is similar to the fifth preferred embodiment, however, the sixth preferred embodiment performs the 2D-DCT process of a predetermined unit on the CQI of all the antennas, differently from the fifth preferred embodiment. FIG. 23 shows data distribution for each antenna in the case of the 2D-DCT process of 4×4 unit is performed.

If there is no- or little-correlation between the antennas, or if the DM efficiency is very low because the demodulator of the reception side does not use the SIC (Successive Interference Cancellation) scheme, the fifth and sixth preferred embodiments are more effectively used.

Seventh Preferred Embodiment

FIG. 24 shows data distributed to individual antennas for use in a data transmission method according to a seventh preferred embodiment of the present invention.

The seventh preferred embodiment measures the CQI a predetermined number of times at intervals of a specific time (e.g., sub-frame of 0.5 ms units), collects the execution results, configures M×N matrix for each antenna, and performs the 2D-DCT process on the matrix. Except the point that the DM process is not performed, all the operations of the seventh preferred embodiment are equal to those of the third preferred embodiment, such that the same operations will be omitted. FIG. 24 shows the 4×4 matrix for the 4-antenna system. The above-mentioned operations of FIG. 24 can be applied to not only the first antenna but also the second to fourth antennas in the same manner as in the third preferred embodiment.

The seventh preferred embodiment can be effectively applied to a case in which the corresponding time is very long in a time domain between individual antennas, so there is a low CQI variation.

Eighth Preferred Embodiment

FIGS. 25~27 are conceptual diagrams illustrating data distributed to individual antennas for use in a data transmission method according to an eighth preferred embodiment of the present invention.

The eighth preferred embodiment firstly transmits the CQI (i.e., third data) for all the antennas to the reception side, and then transmits fourth data for adjusting the size of the third data to the reception side.

The third data is indicative of reference information acting as a basis of error-rate measurement or error correction of the fourth data (See FIGS. 25 and 26). Indeed, the third data performs the same function as that of the second data of the fourth preferred embodiment. Therefore, the third data may be transmitted at intervals of a predetermined transmission period, or may be triggered according to a specific event generated from the reception- or transmission-side. If the third data is transmitted at intervals of a predetermined transmission period, it is preferable that the third data has a transmission period longer than that of the fourth data.

The third data is used as reference information, however, it is preferable that the DM process having a high error rate during the transmission process may not be applied to the third data (See FIG. 25). However, the 2D-DCT process of a predetermined unit can be selectively applied to the third data (See FIG. 26), because the 2D-DCT process can compress data with relatively low error rate.

In the meantime, the fourth data is created when the DM process is performed on the CQI for each CQI band corresponding to CQI of individual CQI bands contained in the third data, such that the amount of information of the third data is minimized (See FIG. 26).

Preferably, the third data having a relatively large amount of transmission information is simultaneously transmitted via the MAC signaling process. Preferably, the fourth data having a relatively small amount of transmission information is transmitted over the physical channel.

The eighth preferred embodiment has an advantage in that it can more greatly reduce the amount of fourth data corresponding to real CQI as compared to the third data, however, it has a disadvantage in that it unavoidably increases an amount of accumulated errors due to the repeated executions of the DM. Therefore, a trade-off between the triggering policy or the transmission period policy of the third data between the transmission policy of the fourth data for effectively employing communication resources is required.

Ninth Preferred Embodiment

The ninth preferred embodiment assigns different transmission channels to third and fourth data, differently from the eighth preferred embodiment. In other words, the ninth preferred embodiment is characterized in that the third data and the fourth data are transmitted over the physical channel.

The first to ninth preferred embodiments of the second aspect of the present invention assume that the DM- and/or DCT-processed CQI is simultaneously transmitted over a sub-frame of a corresponding time, however, it should be noted that the scope of the present invention is not limited to the above-mentioned assumption. In other words, if sub-frames (each of which has a predetermined time unit) corresponding to the number of maximum-supportable antennas are set to a predetermined feedback cycle, the individual antennas actually used by the UE are assigned to specific sub-frames contained in the feedback cycle, and data transmission is executed during the feedback cycle, such that information to be transmitted can be properly distributed.

The above-mentioned method for divisionally transmitting the data will hereinafter be described with reference to FIG. 28. In this case, provided that the number of maximum-supportable antennas is 4 and the sub-frames of 50 ms units are used, the feedback cycle is equal to 200 ms (=4×50 ms).

FIG. 28 is a conceptual diagram illustrating a data distribution transmission method commonly applied to the first to eighth preferred embodiments of the present invention. FIG. 28(a) shows a specific case in which the 4-antenna system actually uses only one antenna. In this case, the first antenna is assigned to the first sub-frame of each feedback cycle, however, it should be noted that the first antenna may be assigned to any sub-frames contained in the same feedback cycle. FIGS. 28(b) and 28(c) show a specific case in which the 4-antenna system actually uses two antennas. In this case, the first and second antennas can be freely assigned to any sub-frames contained in the same feedback cycle. In FIG. 28(b), the first and second antennas are assigned to the first and second sub-frames. In FIG. 28(c), the first and second antennas are assigned to the first and third sub-frames. FIG. 28(d) shows a specific case in which the 4-antenna system actually uses all of the four antennas. Specific orders are assigned to the antennas, such that the antennas are sequentially operated.

According to the second aspect of the present invention, an amount of data to be transmitted to the reception side can be minimized by the DCT- and/or DM-process, such that a limited amount of physical channels can be effectively used, large-capacity reference data for increasing the information accuracy is transmitted via the MAC signaling having a large bandwidth, the minimized data is transmitted over the physical channel, such that the transmission channels can be effectively used, resulting in the increased downlink scheduling gain of the Node-B.

In the meantime, a third aspect of the present invention will hereinafter be described with reference to the above-mentioned first and second aspects of the present invention, such that it can be applied to a variety of MIMO systems (e.g., single-user MIMO system, multi-user MIMO system, SCW system, and MCW system, etc.).

According to the third aspect of the present invention, a predetermined compression algorithm is applied to corresponding feedback information when the feedback information is transmitted from the reception side to the transmission side of the multi-antenna system, such that the amount of feedback information can be greatly reduced. Therefore, a multi-antenna system, feedback information fed back from a corresponding system, and a variety of compression methods will hereinafter be described.

FIG. 29 is a block diagram illustrating a general MIMO system based on an OFDM scheme according to the present embodiment. Referring to FIG. 29, the transmission side adds an overlapping bit to a transmission data bit by a channel encoder (not shown), reduces the influence of noise or channel, and converts data bit information into data symbol information by a mapper (not shown). The data symbol is converted into parallel data by the serial-parallel converter 210. The pre-processor 220 performs a predetermined process on the parallel data to increase the reliability of transmission, and the resultant data is converted into space-time signals by the multi-antenna encoder (not shown) and is then transmitted to the reception side. In this case, the pre-processor 220 may perform precoding, space-time coding, interleaving, permutation, and modulation mapping, etc. on the data.

The reception side includes a multi-antenna decoder (not shown), a post-processor 230, a parallel/serial (P/S) converter 240, a demapper (not shown), and a channel decoder (not shown), such that each of them can perform the inverse functions of the multi-antenna encoder (not shown), the S/P converter 210, the pre-processor 220, the mapper (not shown), and the channel encoder of the transmission side.

The multi-antenna system can be classified into an open-loop system and a closed-loop system. The open-loop system is normally operated even though there is no feedback information. The closed-loop system is operated on the basis of the feedback information. The information to be fed back from the closed loop system may include channel status information (CSI), a preceding matrix index (PMI), and a pre-coding weight matrix index, etc.

In order to effectively transmit data to the UE via maximum channel capacity, the mobile communication system provides the link adaptation. In this case, in order to allow the Node-B to perform the link adaptation, the Node-B must receive the CQI (e.g., CINR) from the UE. The feedback information is always fed back irrespective of the closed-loop or open-loop scheme.

If a corresponding MCS (Modulation & Coding Selection) level is selected at a value acquired by measuring downlink CQI and is denoted by proper bits, the resultant value is indicative of the CQI. The Node-B performs the scheduling of the frequency domain using the CQI received from the UE.

The multi-carrier system has different channel qualities for each frequency band at which data is received. The UE transmits the CQI for all the frequency bands to the Node-B to effectively assign resources. In this case, the UE divides a total frequency band into several unit frequency bands, such that it transmits the CQI at individual frequency bands. A single Node-B includes several UEs. If each UE feeds back the CQI, an amount of control overhead for the assignment of effective resources abruptly increases. Therefore, before the UE feeds back the CQI, the above-mentioned preferred embodiment applies the DCT and/r DM process on corresponding CQI, resulting in a minimized amount of feedback information.

FIG. 30 is a block diagram illustrating a transmission/reception unit of a multiple-antenna system for applying a DCT and/or DM scheme to CQI according to the present invention. The reception side includes a multi-antenna decoder (not shown), a S/P converter 310, a mapper (not shown), a channel encoder (not shown), a multi-antenna decoder (not shown) of the reception side, a post-processor 330, a P/S converter 340, a demapper (not shown), and a channel decoder (not shown) in the same manner as in FIG. 29. However, it should be noted that the post-processor 330 of the reception side and the pre-processor of the transmission side may perform additional functions to apply the DCT- and/or DM-process. In this case, it should be noted that the method for applying the DCT process as an example in the pre-processor 320 and the post-processor 330 may also be applied to the first aspect of the present invention of FIG. 2 as necessary.

In the meantime, according to the present embodiment, the transmission side may be indicative of the UE or Node-B, and the reception side may also be indicative of the UE or Node-B. The transmission side and the reception side can communicate with each other using a plurality of sub-carriers orthogonal to each other. In other words, the transmission/reception sides may transmit/receive data according to a variety of methods, for example, OFDM (Orthogonal Frequency Division Multiplexing), OFDMA (Orthogonal Frequency Division Multiplex Access), and SC-FDMA (Single carrier—frequency division multiple access).

The CQI may be indicative of uplink CQI or downlink DQI. For the convenience of description, a specific case in which the downlink CQI is transmitted will hereinafter be described. Therefore, the transmission side may be set to the UE, and the reception side may be set to a wireless network including the UE or Node-B.

A third aspect of the present invention will hereinafter be described, such that the UE can apply a compression algorithm according to the number of users or the categories of codewords.

Tenth Preferred Embodiment

FIG. 31 is block diagram illustrating a method for processing feedback information when a MIMO system for a single user transmits a single codeword (SCW) according to the present invention.

Generally, if a single user monopolistically occupies specific resource areas (e.g., space-time resource area) for data transmission in the MIMO system, this system is called a single user MIMO system. If only a single stream exists and the same MCS (Modulation Coding Set) is applied to the corresponding stream, this system is called a SU (single-user) MIMO SCW (single codeword) system.

As can be seen from FIG. 31, the UE of the closed-loop system feeds back a variety of MIMO-associated information (e.g., CSI, PMI) to the Node-B, performs the DCT process on the feedback result, and feeds back the resultant data to the Node-B. In this case, the CQI feedback process will hereinafter be described.

The UE measures downlink CQI using a predetermined downlink signal transmitted from the Node-B at step S510, and maps the measured CQI to a single stream at step S520. The DCT (and/or DM process is performed on the corresponding stream at step S530, the resultant data is controlled by a predetermined scheme at step S540, and the final data is transmitted to the Node-B.

The data transmission/conversion methods of the first aspect of the present invention can be implemented by the DCT and/or DM process shown in the step S530. In this case, the DCT- or DM-process can be selectively or simultaneously applied to the present embodiment according to the communication situation/characteristics of a corresponding communication system. The 1D-DCT or 2D-DCT process can also be selectively applied to the present embodiment. The transmission control process shown in the step S540 relates to a method illustrating how to feedback the DCT- or DM-processed data to the Node-B.

In brief, feedback information corresponding to a predetermined amount can be transmitted in sub-frame units. In other words, all the data is transmitted via the physical-layer or MAC-layer signaling at a predetermined time. If the amount of the feedback information is greater than signal capacity, feedback information is divisionally transmitted in predetermined time units (i.e., Time Division Multiplexing (TDM)), or only a difference between the reference value and the feedback information is transmitted after the feedback information acting as reference data has been transmitted, such that the amount of the feedback information can be reduced. If only the difference between the reference value and the feedback information is transmitted, the reference feedback information may be transmitted whenever a predetermined event occurs at intervals of a predetermined period.

Eleventh Preferred Embodiment

FIG. 32 is a block diagram illustrating a method for processing feedback information when a MIMO system for a single user transmits multiple codewords (MCW) according to the present embodiment.

Compared with FIG. 31, the example of FIG. 32 independently assigns additional MCS values to individual streams, such that this system of FIG. 32 is called a SU-MIMO MCW system. FIG. 33 is a graph illustrating different channel environments of individual streams according to the present embodiment. In FIG. 33, it is preferable that the example of FIG. 33 may receive the additional CQI values for each codeword (or stream) in the light of the scheduling gain. However, the example of FIG. 33 is not limited to the above-mentioned example, and may feedback only sane CQIs in consideration of the feedback information overhead.

Compared with the feedback process of FIG. 32, the UE measures downlink CQI for each stream using a predetermined downlink signal transmitted from the Node-B at step S610, and maps the measured CQI to individual streams at step S620. The DCT- (and/or DM-) process is performed on each stream or all the streams at step S630, the resultant data is controlled by a predetermined scheme at step S640, and the final data is transmitted to the Node-B.

The DCT- and/or DM-process of the step S630 may be used in the same manner as in the data transmission/conversion methods of the first aspect of the present invention. The step S640 may also be controlled in the same manner as in the transmission control method of the step S540.

12th Preferred Embodiment

FIG. 34 is block diagram illustrating a method for processing feedback information when a MIMO system for multiple users transmits multiple codewords (MCW) according to the present embodiment.

In this case, all the users share the stream (Stream#1~Stream #K), and additional NBC values may be applied to individual streams. Individual streams of the 12th preferred embodiment may have different channel environments as shown in FIG. 34. As can be seen from FIG. 34, the 12th preferred embodiment may receive additional CQI values for each codeword (or stream) in the light of the scheduling gain in the same manner as in the 11th preferred embodiment.

During the processing of the feedback information, a plurality of UEs measure individual downlink CQI using a predetermined downlink signal transmitted from the Node-B at step S710, maps the measured CQI to individual streams at step S720. In this case, individual streams share the CQI measured by several UEs. The DCT- and/or DM-process is executed on each stream or all the streams at step S730, is controlled by a predetermined scheme at step S740, such that the resultant data is transmitted to the Node-B.

The DCT- and/or DM-process of the step S730 may be used in the same manner as in the data transmission/conversion methods of the first aspect of the present invention. The step S740 may also be controlled in the same manner as in the transmission control method of the step S540.

Next, a third aspect of the present invention will hereinafter be described, such that a method for processing/transmitting uplink data according to the present invention can be applied to a variety of multi-antenna systems.

FIG. 35 is a block diagram illustrating a transmission side for use in a conventional Palo Also Research Center (PARC) MIMO system according to the present invention. FIG. 36 is a block diagram illustrating a transmission side for use in an improved Palo Also Research Center (PARC) MIMO system employing data-processed feedback information according to the present invention.

As can be seen from FIG. 35, the conventional PARC MIMO system feeds back the index indicating all the CQI bands or sane CQI bands (e.g., Best-N. Therefore, the transmission side selects the MCS on the basis of the index information of the channel quality fed back from the reception side, and assigns the selected EC to individual streams or antennas, such that it can adaptively cope with the channels.

The method for transmitting/transforming data and the PARC MIMO system according to the present invention feed back the CQI of each antenna or CQI-associated information, instead of the CQI index information, and reduce an amount of data by the DCT and/or DM process. Therefore, the reception side of the PARC MIMO system according to the present invention must further include a module or function for performing the DCT- and/or DM-process on the CQI, and the transmission side thereof must further include a module or function for recovering the feedback CQI.

FIGS. 37~39 are block diagrams illustrating transmission sides for use in a Palo Also Research Center (PARC) MIMO system supporting multiple users using two transmission antennas according to the present invention. FIG. 37 shows a transmission side for use in the conventional MU (Multi-user) PARC MIMO system. In this case, several users share the antenna (or stream) at the same time, each user measures the CQI on the basis of the signal received from his or her transmission (Tx) antenna, and feeds back the measured result to the transmission side. In this case, the signal received from the antenna not assigned to the user act as an interference component, such that the SINR value acquired from the reception side is changed according to reception-side categories. Therefore, the reception-side categories must be reflected in the CQI calculation time, such that the CQI amount increases.

In order to cope with the above-mentioned situation, the example of FIG. 38 performs the DCT and/or DM process on the feedback CQI, such that it reduces the amount of the increased CQI.

FIG. 39 shows a specific case in which the pre-coding (V) is applied to the conventional PARC system. In this case, the DCT- and/or DM-feedback CQI is used as the reference information for selecting the MCS level. Besides, the DCT- and/or DM-feedback CQI can be widely used for scheduling of the frequency domain or assigning overall resources.

FIGS. 40~42 are block diagrams illustrating a transmission side of a PGRC (Per Group Rate Control) MIMO system according to the present invention. In more detail, FIG. 40 is a block diagram illustrating a basic PGRC system employing two codewords. In this case, the basic PGRC system must measure each CQI corresponding to two CWs, the measured CQI is DCT- and/or DM-processed, and is then fed back. The PGRC system capable of supporting the multi-user using four antennas enables users to share specific resources. In this case, each user measures the downlink CQI for his or her antenna, performs the DCT and/or DM process on the measured CQI, and feeds back the resultant data to the transmission side (i.e, Node B).

FIG. 42 shows a specific case in which the pre-coding step V is added to the PGRC system. In this case, the reception side performs the DCT and/or DM process on the measured CQI, and feeds back the resultant data, such that it can effectively use uplink channel capacity. FIGS. 43-45 are block diagrams illustrating transmission sides of a S-VAP MIMO system according to the present invention.

In more detail, FIG. 43 shows a transmission side of a basic S-VAP MIMO system. FIGS. 44 and 45 show a transmission side of the S-VAP MIMO system to which the pre-coding step is added. In this case, the reception side performs the DCT and/or DM process on the measured CQI, and feeds back the resultant data, thereby reducing an amount of transmission data. Upon receiving the data-processed CQI, the transmission side recovers the received CQI, and uses the recovery data to estimate a transmission rate and determine a transmission power. The reception side (UE) and the transmission side (Node-B) in FIGS. 36, 38, and 45 can include a predetermined data processing module for implementing the data processing step of FIG. 2 to process the DCT and/or DM process, respectively.

According to the above-mentioned third aspect of the present invention, a variety of multi-carrier systems supporting the OFDM transmit uplink data (e.g., CQI) using the compression algorithm (e.g., DCT), such that the amount of uplink overhead can be reduced. Due to the reduction of overhead, the scheduling gain of the frequency domain increases, resulting in the increased system processing rate.

A mobile terminal to which the above-mentioned inventive methods for transmitting/transforming data is applied will hereinafter be described in detail.

FIG. 46 is a block diagram illustrating a User Equipment (UE) according to the present invention. Referring to FIG. 46 the mobile terminal (i.e., UE) includes a controller 310, a RF unit 320, a memory 330, a voice processor 340, an input unit 350, and a display 360.

The controller 310 controls overall operations of the mobile terminal, and performs a specific operation and data processing on target data. Upon receiving a control signal from the controller 310, the RF unit 320 receives an external signal, and transmits data to the reception side. The memory 330 temporarily or permanently stores the specific data. The voice processor 340 performs I/O (Input/output) operations of the voice signal created from a microphone or speaker, performs data processing on the voice signal. The input unit 350 receives data from an external part. The display 360 displays data on an external part.

The mobile terminal transmits/receives data over a plurality of sub-carriers, such that the RF unit 320 transmits data over the sub-carriers. The controller 310 measures CQI using the RF unit 320. The CQI size is controlled by the internal or external length adjustment block (not shown). The DCT process is executed on the size-adjusted data by the internal or external-DCT module (not shown), the resultant data is divided into specific-sized data bits by the information decomposition module (not shown), and is then transmitted to the reception side. The length adjustment block, the DCT module, the DCT information compression module, and the information decomposition module can be implemented by hardware or software. The resultant data of the individual blocks or modules may be stored in the memory 330.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention minimizes an amount of information to be transmitted to a reception side, transmits the minimized information, and effectively using limited wireless resources. The transmission information may be freely selected, and the present invention can be applied to a variety of technical fields. If the present invention is used to transmit the CQI, it minimizes the performance deterioration of a multi-carrier system, and sufficiently transmits the space-time-variable CQI to the Node-B using a small amount of control information. The DCT is executed on the measured CQI, some parts of the DCT coefficients are transmitted, such that an amount of overhead of feedback information transmitted to the physical channel is minimized, and can properly feed back the CQI according to the channel variation speed.

The present invention minimizes an amount of data to be transmitted from a multi-antenna communication system to the reception side via the DCT and/or DM process, and limited physical channels can be effectively used. The large-capacity reference data increasing the information accuracy is transmitted over the MAC signaling having a relatively large bandwidth, and the minimized data is transmitted over the physical channel.

As a result, the present invention greatly increases the scheduling gain of the frequency domain, thereby improving a system processing rate.

The invention claimed is:

1. A method for transmitting data using a Discrete Cosine Transform (DCT) in a communication system based on a plurality of sub-carriers, the method comprising:
performing a Discrete Cosine Transform (DCT) on first data;
selecting a predetermined number of data from the DCT-performed first data, and quantizing the selected data; and
transmitting the quantized selected data to a reception side, wherein the quantized selected data is created at intervals of a transmission unit time, and the transmitting the quantized selected data includes:
transmitting the quantized selected data created at a reference transmission unit time as reference data to the reception side; and
transmitting a difference value between the reference data and quantized selected data created at a predetermined number of transmission unit times, after a lapse of the reference transmission unit time, to the reception side.

2. The method according to claim 1, wherein the first data is created by inserting a predetermined bit into second data, or is created by puncturing a predetermined bit on the second data.

3. The method according to claim 2, wherein the first data is transmitted over a physical layer, and the second data is transmitted over an upper layer.

4. The method according to claim 1, wherein the communication system is a multi-antenna communication system employing multiple antennas, and
the method further comprises:
performing a differential modulation (DM), on the basis of the quantized selected data of a reference antenna among the multiple antennas, on the quantized selected data of the remaining antennas; and
transmitting the quantized selected data of the reference antenna and the DM-performed data of the remaining antennas among the multiple antennas to the reception side.

5. The method according to claim 4, wherein:
the multi-antenna communication system is a multi-antenna communication system employing multiple streams, and
the first data is created for each of the multiple streams.

6. A method for receiving data using an Inverse Discrete Cosine Transform (IDCT) in a communication system based on a plurality of sub-carriers, the method comprising:
receiving quantized resultant data corresponding to some parts of total data as reference data from a transmission side at a reference transmission unit time;
receiving a difference value between the reference data and quantized resultant data created at a predetermined number of transmission unit times, after a lapse of the reference transmission unit time, from the transmission side;
receiving control information for recovering data from the transmission side;
recovering the total data based on the reference data, the difference value and the control information; and
performing the IDCT on the recovered total data.

7. A mobile terminal for transmitting/receiving data using a plurality of sub-carriers, the mobile terminal comprising:
a Discrete Cosine Transform (DCT) module for performing a DCT on first data corresponding to information transmitted to a reception side;
a data processing module for selecting some parts of output data of the DCT module, and quantizing the selected data; and
a wireless module for transmitting the quantized resultant data to the reception side,
wherein the data processing module creates the quantized resultant data at intervals of a transmission unit time, and
wherein the wireless module transmits the quantized resultant data created at a reference transmission unit time as reference data to the reception side, and transmits a difference value between the reference data and quantized resultant data created at a predetermined number of transmission unit times after a lapse of the reference transmission unit time to the reception side.

8. A mobile communication system for transmitting/receiving data using a plurality of sub-carriers, the mobile communication system comprising:
a wireless module for receiving quantized resultant data corresponding to some parts of a total bitstream as reference data from a mobile terminal at a reference transmission unit time, and receiving a difference value between the reference data and quantized resultant data created at a predetermined number of transmission unit times, after a lapse of the reference transmission unit time, from the transmission side;
a data processing module for recovering the total bitstream based on the reference data, the difference value and control information; and
an Inverse Discrete Cosine Transform (IDCT) module for performing an IDCT on the recovered total bitstream.

* * * * *